United States Patent
Imanishi

(10) Patent No.: US 11,307,555 B2
(45) Date of Patent: Apr. 19, 2022

(54) NUMERICAL CONTROL METHOD AND PROCESSING DEVICE

(71) Applicant: FANUC CORPORATION, Yamanashi (JP)

(72) Inventor: Kazutaka Imanishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 34 days.

(21) Appl. No.: 16/561,136

(22) Filed: Sep. 5, 2019

(65) Prior Publication Data

US 2020/0117163 A1 Apr. 16, 2020

(30) Foreign Application Priority Data

Oct. 11, 2018 (JP) .............................. JP2018-192657

(51) Int. Cl.
*G05B 19/19* (2006.01)
(52) U.S. Cl.
CPC .... *G05B 19/19* (2013.01); *G05B 2219/35012* (2013.01); *G05B 2219/36056* (2013.01)
(58) Field of Classification Search
CPC .............. G05B 19/19; G05B 19/41865; G05B 2219/32283; G05B 2219/33098; G05B 2219/34348; G05B 2219/35012; G05B 2219/36056; G05B 2219/36237; G05B 2219/36242

See application file for complete search history.

(56) References Cited

U.S. PATENT DOCUMENTS

| 2003/0023341 A1* | 1/2003 | Sagawa | G05B 19/4093 700/159 |
| 2009/0212033 A1* | 8/2009 | Beck | B23K 26/16 219/121.72 |

(Continued)

FOREIGN PATENT DOCUMENTS

| JP | 62-140740 | 6/1987 |
| JP | 5-324046 | 12/1993 |

(Continued)

OTHER PUBLICATIONS

Mormann et al. The Cerec 3—A quantum leap for computer-aided restorations: Initial Clinical Results; Restorative Dentistry, vol. 31, No. 10, pp. 699-712, Year: 2000. (Year: 2000).*

(Continued)

*Primary Examiner* — Chad G Erdman
(74) *Attorney, Agent, or Firm* — Wenderoth, Lind & Ponack, L.L.P.

(57) ABSTRACT

To provide a numerical control method and a processing device capable of generating a plurality of machine-specific machining programs, from one machining program to a single workpiece. A numerical control method is to be executed by a computer. The numerical control method includes a generating step of dividing, into a plurality of paths, a machining path of an original NC program for a machine configured to machine a single workpiece, corresponding to contents of machining to the workpiece in the original NC program, and of generating, on the basis of the respective divided machining paths, individual NC programs for machines corresponding to the respective machining paths.

5 Claims, 18 Drawing Sheets

(56) References Cited

U.S. PATENT DOCUMENTS

| | | | | |
|---|---|---|---|---|
| 2012/0219930 A1* | 8/2012 | Heinz | ................ | A61C 13/0022 |
| | | | | 433/215 |
| 2017/0212495 A1* | 7/2017 | Okita | ................. | G05B 19/4069 |
| 2017/0242408 A1* | 8/2017 | Uchida | .................... | G05B 6/02 |
| 2019/0101904 A1* | 4/2019 | Shimamura | .......... | G05B 19/052 |

FOREIGN PATENT DOCUMENTS

| | | |
|---|---|---|
| JP | 7-98609 | 4/1995 |
| JP | 7-178645 | 7/1995 |
| JP | 10-97316 | 4/1998 |
| JP | 10-506211 | 6/1998 |
| JP | 2001-1230 | 1/2001 |

OTHER PUBLICATIONS

Notification of Reasons for Refusal dated Sep. 29, 2020 in Japanese Patent Application No. 2018-192657.

* cited by examiner

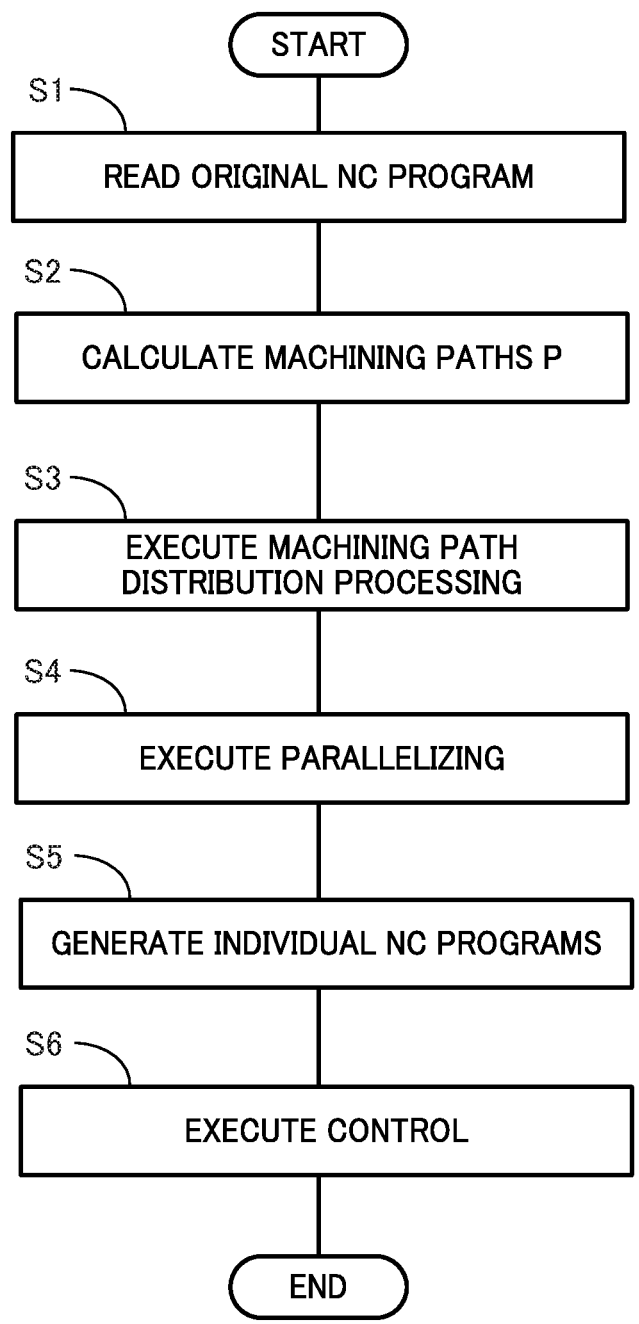

NUMERICAL CONTROL METHOD AND PROCESSING DEVICE

This application is based on and claims the benefit of priority from Japanese Patent Application No. 2018-192657, filed on 11 Oct. 2018, the content of which is incorporated herein by reference.

BACKGROUND OF THE INVENTION

Field of the Invention

The present invention relates to a numerical control method and a processing device for making a plurality of machines operate cooperatively.

Related Art

Conventionally, a computerized numerical control (CNC) technique has been proposed, in which two or more machines cooperate to machine a single workpiece (refer to, for example, Patent Document 1). It is noted that examples of such a machine include a robot capable of being equipped with a variety of tools.

A balance cutting technique has been known, in which rough machining and finishing are simultaneously executed to a single workpiece, by use of two tool posts (refer to, for example, Patent Document 2).

Patent Document 1: Japanese Unexamined Patent Application, Publication No. 2001-1230

Patent Document 2: Japanese Unexamined Patent Application, Publication No. H07-178645

SUMMARY OF THE INVENTION

CAD/CAM (computer aided design/computer aided manufacturing) software is provided not only to design a machining surface shape of a product but also to generate a machining program for machining a workpiece into the designed machining surface shape. However, the CAD/CAM generates just one machining program for one workpiece. With this program, a plurality of machines are not made to operate cooperatively.

That is, in order to make a plurality of machines cooperatively machine a single workpiece, an operator or the like has to generate machine-specific machining programs. It is noted that examples of a machining program include an NC (numerical control) program.

A balance cutting technique is applicable only to lathing, and is not applicable to machining other than lathing.

The object of the present invention is to provide a numerical control method and a processing device capable of generating a plurality of machine-specific machining programs, from one machining program to a single workpiece.

(1) A numerical control method according to the present invention is to be executed by a computer. The numerical control method includes a generating step of dividing, into a plurality of paths, a machining path of a first machining program for a machine configured to machine a single workpiece, corresponding to contents of machining to the workpiece in the first machining program, and of generating, on the basis of the respective divided machining paths, a plurality of second machining programs for a plurality of machines corresponding to the respective machining paths.

(2) In the numerical control method according to (1), the plurality of second machining programs may be generated in the generating step, so as to correspond to areas subjected to the machining to the workpiece respectively by the plurality of machines.

(3) In the numerical control method according to (1), the plurality of second machining programs may be generated in the generating step, so as to correspond to required machining accuracy to be required in the machining to the workpiece and machining accuracies of the plurality of machines.

(4) In the numerical control method according to (1), the plurality of second machining programs may be generated in the generating step, so as to correspond to acceleration/deceleration time constants of the plurality of machines.

(5) The numerical control method according to (1) may further include a frequency analyzing step of executing frequency analysis to the machining path indicated in the first machining program, and dividing the machining path into a plurality of machining paths of frequency components. In the generating step, the plurality of second machining programs may be generated, so that each of the plurality of machining paths of frequency components is assigned to any one of the plurality of machines according to performance of the plurality of machines.

(6) The numerical control method according to (1) may further include a frequency analyzing step of executing frequency analysis to a shape to be formed on the workpiece and dividing the shape into a plurality of shapes of spatial frequency components. In the generating step, the plurality of second machining programs may be generated, so as to make any one of the plurality of machines form each of the plurality of shapes of spatial frequency components according to performance of the plurality of machines.

(7) In the numerical control method according to (5) or (6), the performance of the plurality of machines may correspond to acceleration/deceleration time constants.

(8) The numerical control method according to any one of (1) to (7) may further include a parallelizing step of, when the plurality of second machining programs are executed in parallel by the plurality of machines, executing determination of whether or not interference occurs among the plurality of machines, and adjusting timing of executing in parallel the plurality of second machining programs so as to avoid the interference according to a result of the determination.

(9) A processing device according to the present invention includes a generating unit configured to divide, into a plurality of paths, a machining path of a first machining program for a machine configured to machine a single workpiece, corresponding to contents of machining to the workpiece in the first machining program, and to generate, on the basis of the respective divided machining paths, a plurality of second machining programs for a plurality of machines corresponding to the respective machining paths.

The present invention enables to generate a plurality of machine-specific machining programs from one machining program to a single workpiece.

BRIEF DESCRIPTION OF THE DRAWINGS

FIG. 3 is a diagram indicating one example of numerical control processing in the numerical controller according to the first embodiment.

DETAILED DESCRIPTION OF THE INVENTION

Some embodiments according to the present invention will be described below.

First Embodiment

The first embodiment is described first. In the first embodiment, a machining path in a first machining program is divided into a plurality of machining-area-specific (for example, an area of X>0 and the other area) machining paths. In the first embodiment, a plurality of second machining programs indicating the machining paths respectively of a plurality of machines are generated on the basis of the respective divided machining paths.

It is noted that the first machining program in the first embodiment is preferably used in primary machining (for example, rough machining to the workpiece) prior to finishing. That is, the surface of a workpiece WR in the vicinity of the boundary (for example, X=0) between the machining areas of a machine PM1 and a machine PM2 may have the step or the like formed in the machining by the two machines PM1, PM2. In this case, secondary machining (for example, finishing) is performed, whereby the step or the like is removed.

Figure 1:
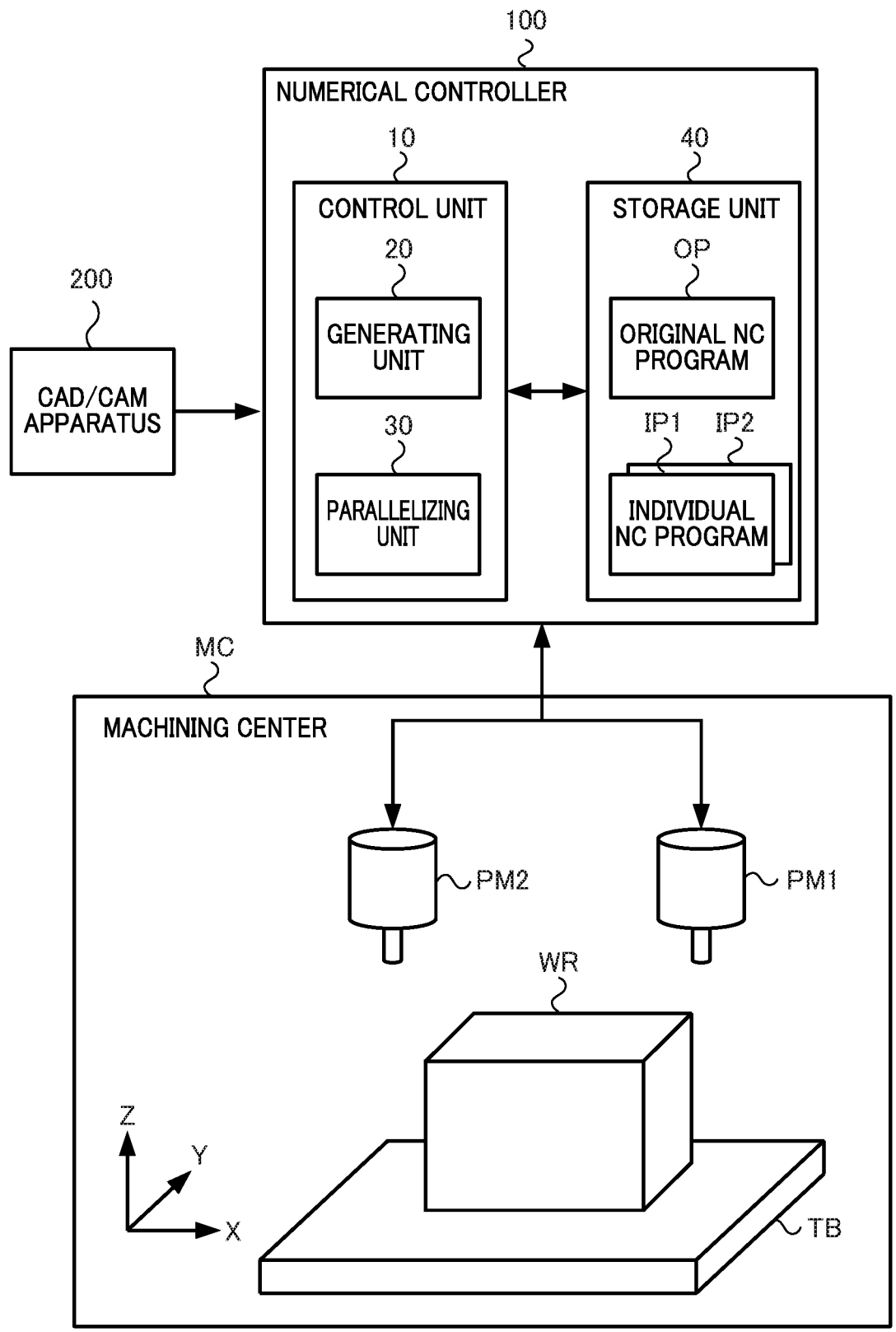
FIG. 1 is a diagram illustrating one example of a numerical controller according to a first embodiment of the present invention.

FIG. 1 is a diagram illustrating one example of a numerical controller as a processing device according to the first embodiment of the present invention.

A numerical controller 100 according to the first embodiment is a computer having a control unit 10 such as a processor and a storage unit 40 such as a hard disk drive. The numerical controller 100 further has a function of interfacing with external devices, such as an input/output device and a communication interface. Accordingly, the numerical controller 100 is connected to an external CAD/CAM apparatus 200 and an external machining center MC by wired or wireless connection. It is noted that the numerical controller 100 may be connected to the CAD/CAM apparatus 200 and the machining center MC via a network.

The CAD/CAM apparatus 200 is a computer having, for example, an operation processing device such as a processor and a storing unit such as a hard disk drive. The CAD/CAM apparatus 200 functions as a CAD/CAM apparatus, when the operation processing device executes the CAD/CAM program stored in the storing unit. The CAD/CAM apparatus 200 designs a machining surface shape such as of a product or a component, on the basis of the instruction input by an operator or the like through an input device such as a keyboard or a mouse included in the CAD/CAM apparatus 200. The CAD/CAM apparatus 200 generates the CAD data indicating the designed machining surface shape such as of the product or the component.

The CAD/CAM apparatus 200 generates a machining program for machining a workpiece into the designed machining surface shape, by use of the generated CAD data. The CAD/CAM apparatus 200 transmits the generated machining program to the numerical controller 100. The numerical controller 100 then stores the received machining program in the storage unit 40 as an original NC program OP corresponding to the first machining program.

The machining center MC has two units of the machines PM1, PM2 and a table TB. The machining center MC further has a function of interfacing with external devices, such as an input/output device and a communication interface. Accordingly, the machining center MC is connected to the external numerical controller 100 by wired or wireless connection. It is noted that the machining center MC may be connected to the numerical controller 100 via a network.

The machines PM1, PM2 are, for example, spindle units. A tool corresponding to a machining content such as slicing, drilling or boring is attached to each of the machines PM1, PM2, on the basis of the command of the NC program executed by the numerical controller 100, via the tool magazine included in the machining center MC. In an example, the machines PM1, PM2 are respectively disposed in the two moving mechanisms having servo motors and ball screws (not shown) provided in the directions of the X axis, the Y axis and the Z axis. The two moving mechanisms operate on the basis of the command of the NC program executed by the numerical controller 100, whereby the machines PM1, PM2 move mutually independently in the directions of the X axis, the Y axis and the Z axis. It is noted that the machining center MC may have three or more machines, unlike the above-described machining center MC having the two machines PM1, PM2.

In an example, the table TB is disposed so that the plane thereof facing the machines PM1, PM2 is disposed in parallel with the X-Y plane, and the single workpiece WR to be machined is disposed on the plane. The table TB is disposed and fixed to the machining center MC. The present invention is not limited thereto. The table TB may be disposed movably to the machining center MC.

In the numerical controller 100, the control unit 10 executes the program of numerical control processing stored in the storage unit 40, thereby functioning as a generating unit 20 and a parallelizing unit 30.

In an example, upon the reception of the instruction input by an operator or the like through the input device such as a touch panel included in the numerical controller 100, the generating unit 20 reads, from the storage unit 40, the original NC program OP received from the CAD/CAM apparatus 200. The generating unit 20 divides the machining path of the original NC program OP for the machine configured to machine a single workpiece, into a plurality of paths, according to the contents of machining to the workpiece in the original NC program OP. The generating unit 20 generates an NC program IP1 and an NC program IP2 (hereinafter, also referred to as "individual NC programs IP") for the respective machines PM1, PM2, so that the machines PM1, PM2 operate cooperatively on the basis of the respective divided machining paths.

More specifically, the generating unit 20 defines the machining area for the machine PM1 (for example, the area of X>0) and the machining area for the machine PM2 (for example, the area of X≤0), on the basis of, for example, the instruction input by an operator or the like. The generating unit 20 decodes a G code for each block of the read original NC program OP, and acquires command information such as on the XYZ coordinate of a set destination and a feed rate. The generating unit 20 calculates three-dimensional machining paths P (t, X(t), Y(t), Z(t)) indicated by the original NC program OP, by use of the acquired command information. It is noted that t denotes the time elapsed from the start of the numerical control processing, which is measured in the time interval of the control cycle by the numerical controller 100, wherein the time t at the start of the processing is set to "0." That is, a time t and the coordinates X(t), Y(t), Z(t) in a machining path P are discrete values.

The generating unit 20 stores, in the storage unit 40 as machining path data on the machine PM1, the machining paths P (t, X(t), Y(t), Z(t)) included in the machining area of the machine PM1 among the calculated machining paths P (t, X(t), Y(t), Z(t)). The generating unit 20 further stores the data on the machining paths P (t, X(t), Y(t), Z(t)) in the storage unit 40 as machining path data on the machine PM2. The generating unit 20 then generates the individual NC programs IP1, IP2 for the respective machines PM1, PM2, by use of the machining path data on the machines PM1, PM2, on the basis of the determination result in the parallelization processing executed by the parallelizing unit 30 to be described below. The generating unit 20 stores the generated individual NC programs IP1, IP2 for the machines PM1, PM2, in the storage unit 40.

The parallelizing unit 30 reads, from the storage unit 40, the machining path data on the respective machines PM1, PM2 generated by the generating unit 20. The parallelizing unit 30 determines whether or not interference occurs between the machine PM1 and the machine PM2 in the case where the control unit 10 executes in parallel the NC programs generated from the read machining path data on the respective machines PM1, PM2. It is noted that interference information indicates the three-dimensional area in the XYZ space, operation conditions and the like, in which the machines PM1, PM2 interfere mutually is stored in advance in the storage unit 40, and the parallelizing unit 30 may read, from the storage unit 40, the interference information.

More specifically, the parallelizing unit 30 simulates, by the known method disclosed in Patent Document 1 or the like, the operations of the machines PM1, PM2 operated in parallel (simultaneously) on the basis of the machining path data on the respective machines PM1, PM2 by the control unit 10. The parallelizing unit 30 then compares the simulation result with the interference information, and determines whether or not the machine PM1 and the machine PM2 interfere mutually.

In an example, in the case where the individual NC program IP1 for the machine PM1 is to be compared, the parallelizing unit 30 determines whether or not the first block of the individual NC program IP2 for the machine PM2 interferes with the first block of the individual NC program IP1. In the case of determining that interference does not occur, the parallelizing unit 30 allows the machining by the first block of the individual NC program IP2. In the case of determining that interference occurs, the parallelizing unit 30 determines whether or not the first block of the individual NC program IP2 interferes with the second block of the individual NC program IP1. In the case of determining that interfere does not occur, the parallelizing unit 30 allows the cooperative machining by the second block of the individual NC program IP1 and the first block of the individual NC program IP2. Similarly, in the case of determining that none of the blocks of the individual NC program IP2 interferes with any block of the individual NC program IP1, the parallelizing unit 30 may allow the parallelization for the cooperative machining. The parallelizing unit 30 may determine whether or not interference occurs, on the basis of, for example, whether or not the distance between the block to be compared of the individual NC program IP1 and the comparison block of the individual NC program IP2 is identical to or greater than a predetermined value which allows the avoidance of the interference.

In the case of determining that the machine PM1 and the machine PM2 interfere mutually, the parallelizing unit 30 may adjust the timing of starting the operations of the machine PM1, PM2 so that the machine PM1 and the machine PM2 do not interfere mutually, as in the known technique disclosed in Patent Document 1. Alternatively, the parallelizing unit 30 may calculate the time zone in which the machine PM1 and the machine PM2 interfere mutually. In this case, the parallelizing unit 30 may move, for example, the spindle of the machine PM2 to a non-interference area, thereby avoiding the interference with the machine PM1. The parallelizing unit 30 stores the determination result including the adjusted timing or the calculated interference time zone, in the storage unit 40.

Figure 2A:
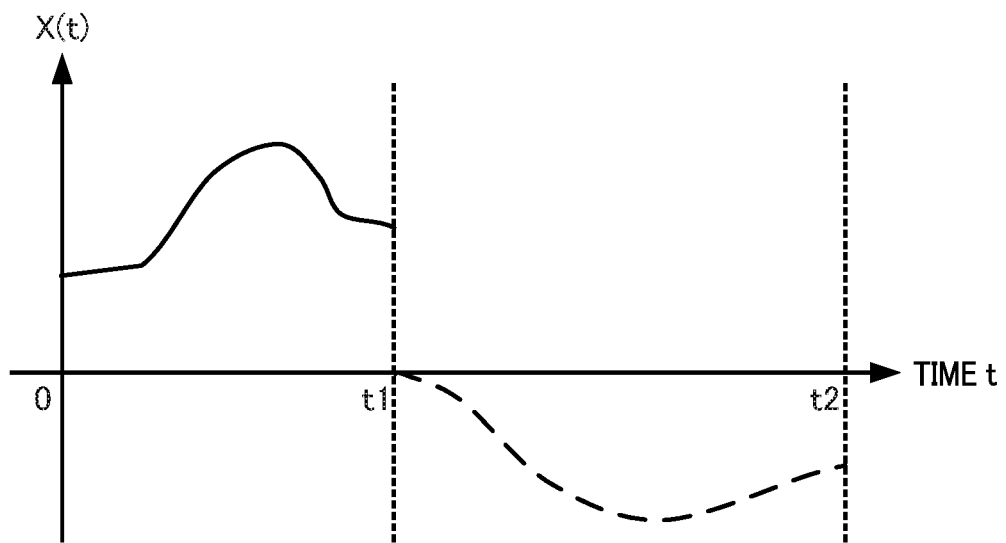
FIG. 2A is a diagram illustrating one example of machining path data on a machine PM1 and a machine PM2, respectively.
Figure 2B:
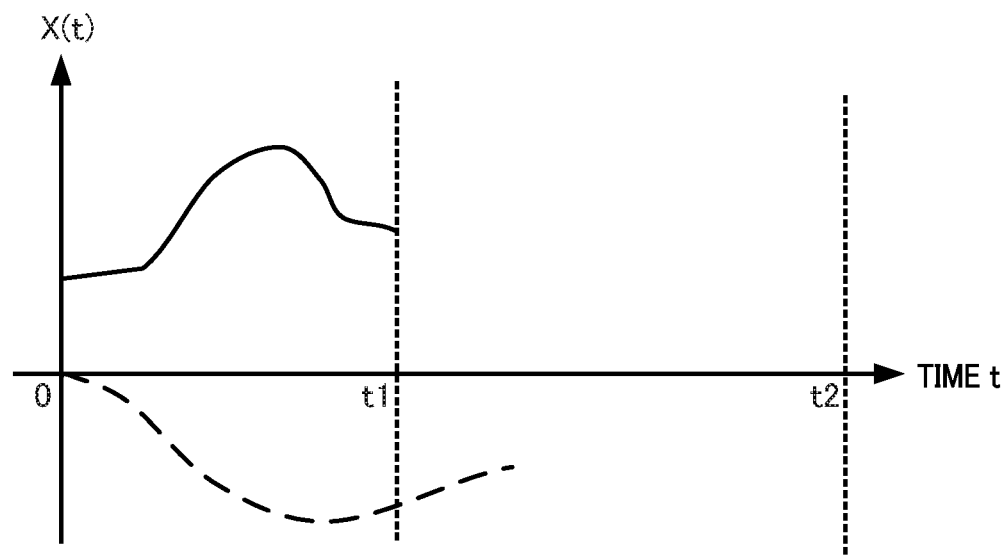
FIG. 2B is a diagram illustrating one example of machining path data on the machines PM1, PM2, respectively.

Each of FIG. 2A and FIG. 2B is a diagram illustrating one example of the machining path data on the respective machines PM1, PM2. The vertical axis of each of FIG. 2A and FIG. 2B denotes an X(t) of the machining path P, and the horizontal axis of each of FIG. 2A and FIG. 2B denotes a time t. The path data on the machine PM1 is indicated by a solid line, and the path data on the machine PM2 is indicated by a broken line.

In FIG. 2A, the machining path data on the machine PM1 is plotted in the range from the time 0 to a time t1, and the machining path data on the machine PM2 is plotted in the range from the time t1 to a time t2.

In the case where the parallelizing unit 30 determines that the machine PM1 and the machine PM2 do not interfere mutually, the generating unit 20 generates the individual NC programs IP1, IP2 for the machines PM1, PM2, by use of the machining path data on the respective machines PM1, PM2, so that the machines PM1, PM2 simultaneously start the machining at the time 0, as shown in FIG. 2B.

In the case where the parallelizing unit 30 determines that interference occurs, the generating unit 20 generates the respective blocks of the individual NC programs IP1, IP2 for the machines PM1, PM2, so that the machines PM1, PM2 start the machining at the different timings by the period of time adjusted by the parallelizing unit 30 to be longer than the interference period of time in which the interference occurs, as an example. Alternatively, in an example, the generating unit 20 generates the respective blocks of the individual NC programs IP1, IP2 for the machines PM1, PM2, so that, even in the case where the machine PM1 and the machine PM2 start the machining in parallel (simultaneously), the machine PM1 or the machine PM2 is made to wait at the interference period of time calculated by the parallelizing unit 30 until the interference ends.

The control unit 10 reads the individual NC programs IP1, IP2 from the storage unit 40, executes the read individual NC programs IP1, IP2 in parallel, and controls the machining executed to the workpiece WR by the machines PM1, PM2.

It is noted that although the area of X>0 and the other area have been described as the machining areas set in advance in the above-described first embodiment, the present invention is not limited thereto. Arbitrary areas may be set. Although the machining area has been divided into two in the above description, the present invention is not limited thereto. Three or more of the machining areas may be set.

FIG. 3 is a diagram indicating one example of the numerical control processing in the numerical controller 100 according to the first embodiment. The processing shown in FIG. 3 is to be executed upon, for example, the operation by an operator or the like through the input device of the numerical controller 100.

In step S1, the generating unit 20 reads, from the storage unit 40, the original NC program OP received from the CAD/CAM apparatus 200.

In step S2, the generating unit 20 decodes a G code for each block of the original NC program OP read in step S1, and acquires command information such as on the XYZ coordinate of a set destination and a feed rate. The generating unit 20 calculates the machining paths P (t, X(t), Y(t), Z(t)) indicated by the original NC program OP, by use of the acquired command information.

In step S3, the generating unit 20 executes machining path distribution processing, by use of the machining paths P (t, X(t), Y(t), Z(t)) calculated in step S2. It is noted that the machining path distribution processing will be described with reference to FIG. 4.

In step S4, the parallelizing unit 30 checks the presence or absence of interference between the machining path of the machine PM1 and the machining path of the machine PM2 generated in step S3, for all the machining paths. In the case where interference occurs, the parallelizing unit 30 adjusts the timing (for example, by inserting waiting processing) of starting the machining operation by the machine PM2 until the interference with the machine PM1 is avoided, as an example.

In step S5, the generating unit 20 generates the individual NC programs IP1, IP2 for the respective machines PM1, PM2, by use of the machining path data on the respective machines PM1, PM2, on the basis of the adjustment result of the timing of starting the machining operation by the machine PM2 in step S4.

In step S6, the control unit 10 executes in parallel the individual NC programs IP1, IP2 generated in step S5, and controls the machining executed to the single workpiece WR by the respective machines PM1, PM2.

Figure 4:
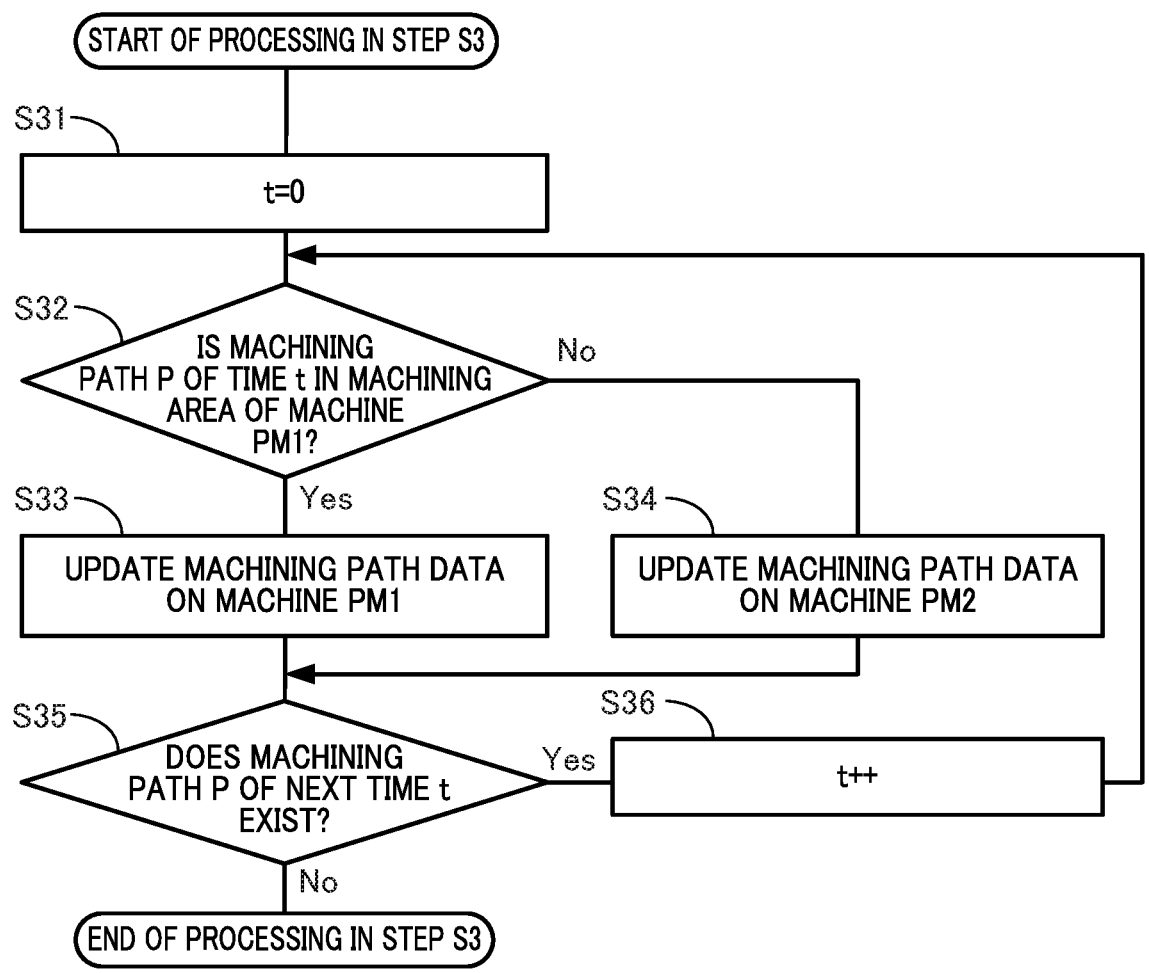
FIG. 4 is a diagram indicating one example of machining path distribution processing of step S3 shown in FIG. 3.

FIG. 4 is a diagram indicating one example of the machining path distribution processing in step S3 shown in FIG. 3.

In step S31, the generating unit 20 resets the time t to 0.

In step S32, the generating unit 20 determines whether or not the machining path P of the time t (t, X(t), Y(t), Z(t)) is in the machining area of the machine PM1. In the case where the machining path P of the time t (t, X(t), Y(t), Z(t)) is in the machining area of the machine PM1, the processing to be executed by the numerical controller 100 proceeds to step S33. In the case where the machining path P of the time t (t, X(t), Y(t), Z(t)) is in the machining area of the machine PM2, the processing to be executed by the numerical controller 100 proceeds to step S34.

In step S33, the generating unit 20 adds the machining path P of the time t (t, X(t), Y(t), Z(t)) determined in step S32 into the machining path data on the machine PM1, and updates the data.

In step S34, the generating unit 20 adds the machining path P of the time t (t, X(t), Y(t), Z(t)) determined in step S32 into the machining path data on the machine PM2, and updates the data.

In step S35, the generating unit 20 determines whether or not the machining path P of the next time t exists. In the case where the machining path P of the next time t exists, the processing to be executed by the numerical controller 100 proceeds to step S36. In the case where the machining path P of the next time t does not exist, the machining path distribution processing ends, and the processing to be executed by the numerical controller 100 proceeds to step S4 shown in FIG. 3.

In step S36, the generating unit 20 increases the time t by one control cycle time, and the processing to be executed by the numerical controller 100 proceeds to step S32.

As described above, in the first embodiment, the numerical controller 100 defines the machining areas of the machines PM1, PM2 in the XYZ space area. The numerical controller 100 generates the machining path data on the machines PM1, PM2 on the basis of the machining paths P calculated from the original NC program OP, and the defined machining areas of the machines PM1, PM2. The numerical controller 100 simulates the operations of the machines PM1, PM2 on the basis of the generated machining path data on the machines PM1, PM2, and determines whether or not interference occurs when the machines PM1, PM2 operate cooperatively. The numerical controller 100 then generates the individual NC programs IP1, IP2 for the respective machines PM1, PM2, on the basis of the machining path data on the machines PM1, PM2 and the determination result.

As a result, the numerical controller 100 is able to generate the specific individual NC programs IP1, IP2 for the machines PM1, PM2 from the one original NC program OP to the single workpiece WR so as to make the machines PM1, PM2 perform machining respectively in the arbitrary machining areas set in advance, thereby enabling to make the machines PM1, PM2 perform machining cooperatively.

In the individual NC programs IP1, IP2 for the machines PM1, PM2, the operations of the machines PM1, PM2 are to be adjusted according to the determination result such as of interference between the machines PM1, PM2. This allows to improve the efficiency in machining by the numerical controller 100, thereby reducing the cycle time.

The first embodiment has been described so far.

Second Embodiment

The second embodiment is described below. In the second embodiment, machining accuracy information is set in advance for each machine. In the case where required machining accuracy varies at respective machining points in the machining path of the first machining program, the path is divided into a plurality of paths so as to correspond to respective machines achieving the required machining accuracies. In the second embodiment, the plurality of second machining programs indicating the machining paths respectively of the plurality of machines are generated on the basis of the respective divided machining paths.

Figure 5:
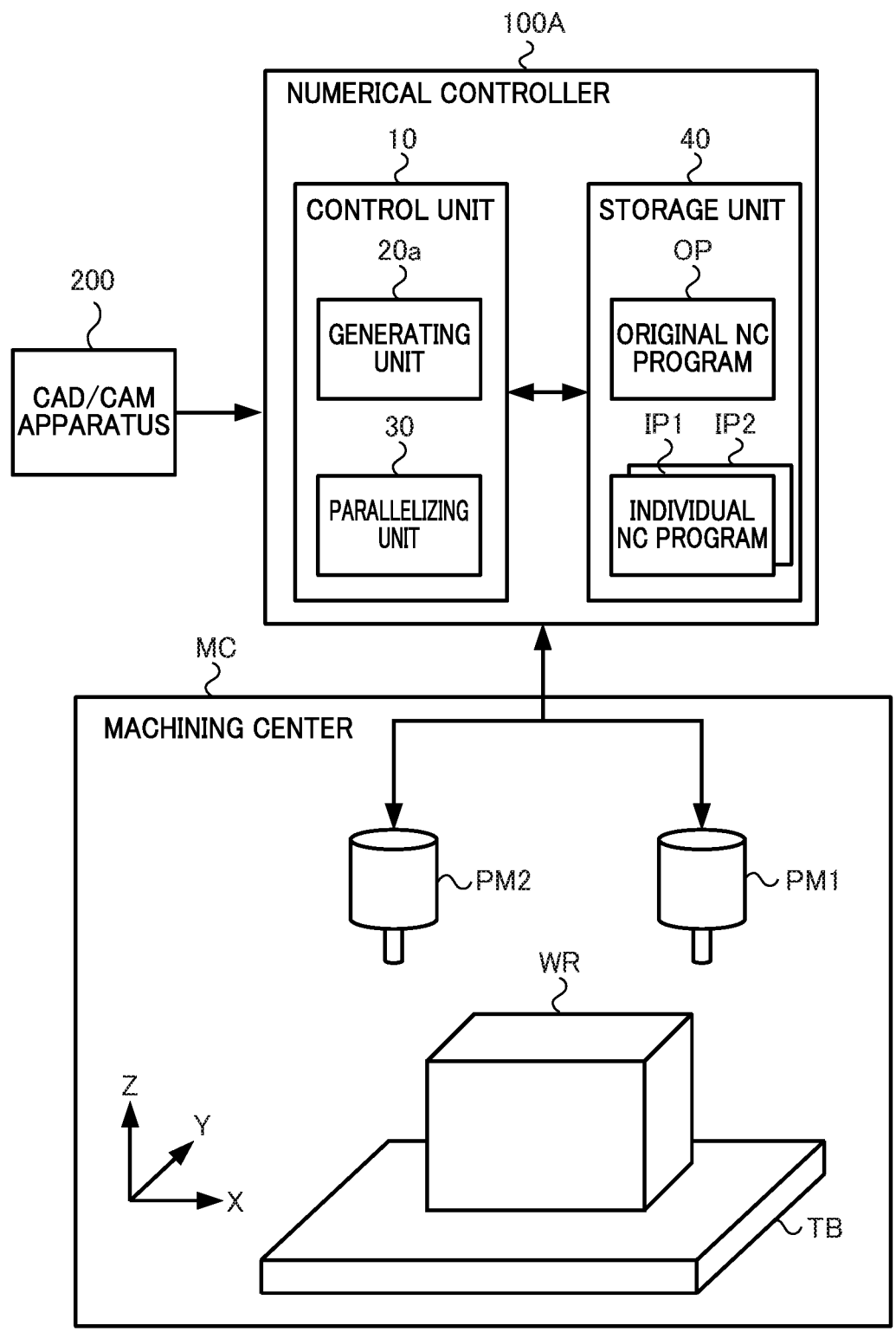
FIG. 5 is a diagram illustrating one example of a numerical controller according to a second embodiment of the present invention.

FIG. 5 is a diagram illustrating one example of a numerical controller according to the second embodiment of the present invention. It is noted that the elements in FIG. 5 having the same functions as the elements of the numerical controller 100 according to the first embodiment are denoted by the same reference numerals, and the detailed descriptions thereof are omitted.

A numerical controller 100A according to the second embodiment has the same configuration as that of the numerical controller 100 according to the first embodiment.

In the case where machining accuracy information is set in advance for each machine and where the required machining accuracy varies at respective machining points in the machining path of the original NC program OP, the numerical controller 100A divides the machining path into a plurality of paths so as to correspond to the respective machines achieving the required machining accuracies. The numerical controller 100A generates the plurality of individual NC programs IP1, IP2 indicating the machining paths respectively of the plurality of machines PM1, PM2, on the basis of the respective divided machining paths. Accordingly, the control unit 10 executes the program of numerical control processing stored in the storage unit 40, thereby functioning as a generating unit 20a and the parallelizing unit 30.

In an example, upon the reception of the instruction input by an operator or the like through an input device included in the numerical controller 100A, the generating unit 20a reads, from the storage unit 40, the original NC program OP received from the CAD/CAM apparatus 200. Herein, the instruction input by an operator or the like includes the tools to be attached to the machines PM1, PM2 and the machining accuracy information indicating the machining accuracies of the tools to be attached. In an example, a tool such as a blade for machining with high machining accuracy (for example, 1 nm) is attached to the machine PM1. A tool such as a blade for machining with low machining accuracy (for example, 1 um) is attached to the machine PM2.

The generating unit 20a generates the individual NC programs IP1, IP2 for the respective machines PM1, PM2 so that the machines PM1, PM2 operate cooperatively, on the basis of the machining path indicated by the read original NC program OP.

More specifically, the generating unit 20a decodes a G code for each block of the read original NC program OP, and acquires command information such as on the XYZ coordinate of a set destination, a feed rate, and a tool to be attached to a machine. The generating unit 20a calculates the machining paths P (t, X(t), Y(t), Z(t)) indicated by the original NC program OP, by use of the acquired command information. The generating unit 20a further determines whether or not the machining accuracies required (hereinafter, also referred to as "required machining accuracy") in the machining paths P of the times t (t, X(t), Y(t), Z(t)) are achieved by the higher machining accuracy of the machine PM1, and whether or not the required machining accuracies are achieved not only by the accuracy of the machine PM1, but also by the lower machining accuracy of the machine PM2, by use of the acquired command information and the machining accuracy information in the input instruction.

The generating unit 20a stores, in the storage unit 40 as the machining path data on the machine PM1, the machining path P (t, X(t), Y(t), Z(t)) whose required machining accuracy is determined to be achieved by the machine PM1, among the machining paths P of respective times t (t, X(t), Y(t), Z(t)). The generating unit 20a stores, in the storage unit 40 as the machining path data on the machine PM2, the machining path P (t, X(t), Y(t), Z(t)) whose required machining accuracy is determined to be achieved not only by the machine PM1 but also by the machine PM2. The generating unit 20a then generates the individual NC programs IP1, IP2 for the respective machines PM1, PM2, by use of the machining path data on the respective machines PM1, PM2, on the basis of the determination result in the parallelization processing executed by the parallelizing unit 30. The generating unit 20a thereafter stores the generated individual NC programs IP1, IP2 for the machines PM1, PM2 in the storage unit 40.

The parallelizing unit 30 has the same function as that of the parallelizing unit 30 in the first embodiment.

Figure 6:
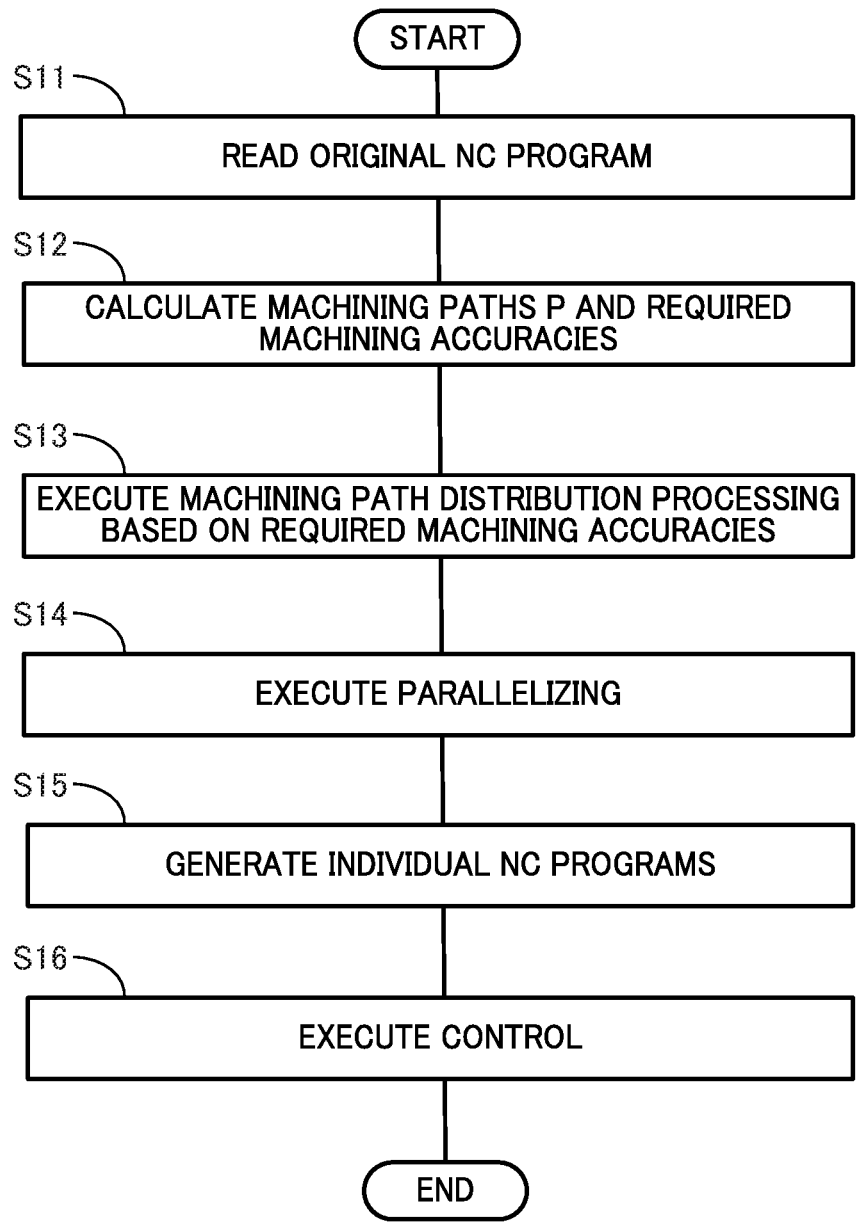
FIG. 6 is a diagram indicating one example of numerical control processing in the numerical controller according to the second embodiment.

FIG. 6 is a diagram indicating one example of the numerical control processing in the numerical controller 100A according to the second embodiment. The processing shown in FIG. 6 is different from the processing in the first embodiment shown in FIG. 3, in that the machining path data on the machines PM1, PM2 is generated according to the required machining accuracies at the machining points of the workpiece WR.

It is noted that the processing shown in FIG. 6 is to be executed upon, for example, the operation by an operator or the like through the input device of the numerical controller 100A. The numerical controller 100A also receives the instruction input by an operator or the like through the input device, including the tools to be attached to the machines PM1, PM2 and the machining accuracy information indicating the machining accuracies of the tools to be attached.

In step S11, the generating unit 20a reads, from the storage unit 40, the original NC program OP received from the CAD/CAM apparatus 200.

In step S12, the generating unit 20a decodes a G code for each block of the original NC program OP read in step S11, and acquires command information such as on the XYZ coordinate of a set destination, a feed rate, and a tool to be attached to a machine. The generating unit 20a calculates the machining paths P (t, X(t), Y(t), Z(t)) indicated by the original NC program OP, by use of the acquired command information. The generating unit 20a further specifies the required machining accuracies in the machining paths P of the times t (t, X(t), Y(t), Z(t)), by use of the acquired command information and the machining accuracy information in the input instruction.

In step S13, the generating unit 20a executes the machining path distribution processing, by use of the machining paths P (t, X(t), Y(t), Z(t)) calculated in step S12, the required machining accuracies and the like. It is noted that the machining path distribution processing will be described with reference to FIG. 7.

In step S14, the parallelizing unit 30 executes the same processing as the operation in which step S3 is replaced with step S13 in the processing indicated in step S4 in the first embodiment.

In step S15, as in step S5 in the first embodiment, the generating unit 20a generates the individual NC programs IP1, IP2 for the respective machines PM1, PM2, by use of the machining path data on the respective machines PM1, PM2, on the basis of the adjustment result in step S14.

In step S16, as in step S6 in the first embodiment, the control unit 10 executes in parallel the individual NC programs IP1, IP2 generated in step S15, and controls the machining executed to the single workpiece WR by the respective machines PM1, PM2.

Figure 7:
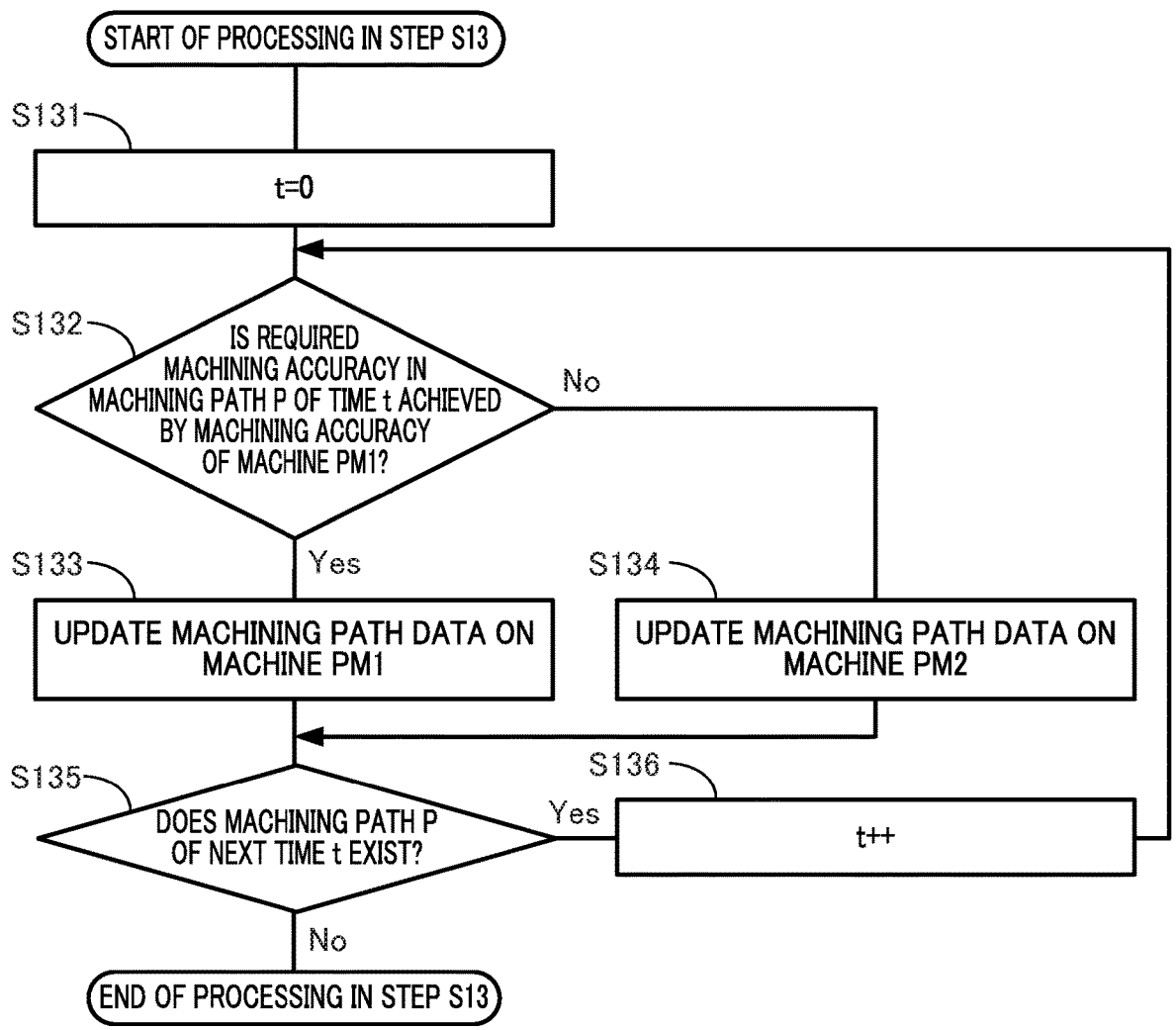
FIG. 7 is a diagram indicating one example of machining path distribution processing of step S13 shown in FIG. 6.

FIG. 7 is a diagram indicating one example of the machining path distribution processing in step S13 shown in FIG. 6.

In step S131, the generating unit 20a resets the time t to 0.

In step S132, the generating unit 20a determines whether or not the required machining accuracy in the machining path P of the time t (t, X(t), Y(t), Z(t)) is achieved by the machining accuracy of the machine PM1. In the case where the required machining accuracy in the machining path P of the time t (t, X(t), Y(t), Z(t)) is determined to be achieved only by the machining accuracy of the machine PM1, the processing to be executed by the numerical controller 100A proceeds to step S133. In the case where the required machining accuracy in the machining path P of the time t (t, X(t), Y(t), Z(t)) is determined to be achieved not only by the machining accuracy of the machine PM1 but also by that of the machine PM2, the processing to be executed by the numerical controller 100A proceeds to step S134.

In step S133, the generating unit 20a adds the machining path P of the time t (t, X(t), Y(t), Z(t)) determined in step S132 into the machining path data on the machine PM1, and updates the data.

In step S134, the generating unit 20a adds the machining path P of the time t (t, X(t), Y(t), Z(t)) determined in step S132 into the machining path data on the machine PM2, and updates the data.

In step S135, the generating unit 20a determines whether or not the machining path P of the next time t exists. In the case where the machining path P of the next time t exists, the processing to be executed by the numerical controller 100A proceeds to step S136. In the case where the machining path P of the next time t does not exist, the machining path distribution processing ends, and the processing to be executed by the numerical controller 100A proceeds to step S14 shown in FIG. 6.

In step S136, the generating unit 20a increases the time t by one control cycle time, and the processing to be executed by the numerical controller 100A proceeds to step S132.

As described above, in the second embodiment, the numerical controller 100A generates the machining path data on the machines PM1, PM2, according to the required machining accuracies in the machining paths P of respective times t (t, X(t), Y(t), Z (t)) to the machining to the single workpiece WR. The numerical controller 100A simulates the operations of the machines PM1, PM2 on the basis of the generated machining path data on the machines PM1, PM2, and determines whether or not interference occurs when the machines PM1, PM2 operate cooperatively. The numerical controller 100A then generates the individual NC programs IP1, IP2 for the respective machines PM1, PM2, on the basis of the machining path data on the machines PM1, PM2 and the determination result.

As a result, as in the first embodiment, the numerical controller 100A is able to generate the specific individual NC programs IP1, IP2 for the machines PM1, PM2 from the one original NC program OP to the single workpiece WR. In the second embodiment, the numerical controller 100A is further able to make the machines PM1, PM2 perform machining cooperatively, according to the required machining accuracies at the machining points of the single workpiece WR.

As in the first embodiment, in the individual NC programs IP1, IP2 for the machines PM1, PM2, the operations of the machines PM1, PM2 are to be adjusted according to the determination result such as of interference between the machines PM1, PM2. This allows to improve the efficiency in machining by the numerical controller 100A, thereby reducing the cycle time.

The second embodiment has been described so far.

Third Embodiment

The third embodiment is described below. In the third embodiment, an acceleration/deceleration time constant and/or a cutting feed rate are/is set in advance for each machine. In the third embodiment, in the case where the required machining speed varies at machining points in the machining path of the first machining program, the machining path is divided into a plurality of paths so as to correspond to respective machines achieving the required machining speeds. In the third embodiment, a plurality of the second machining programs indicating the machining paths respectively of a plurality of machines are generated on the basis of the respective divided machining paths.

Figure 8:
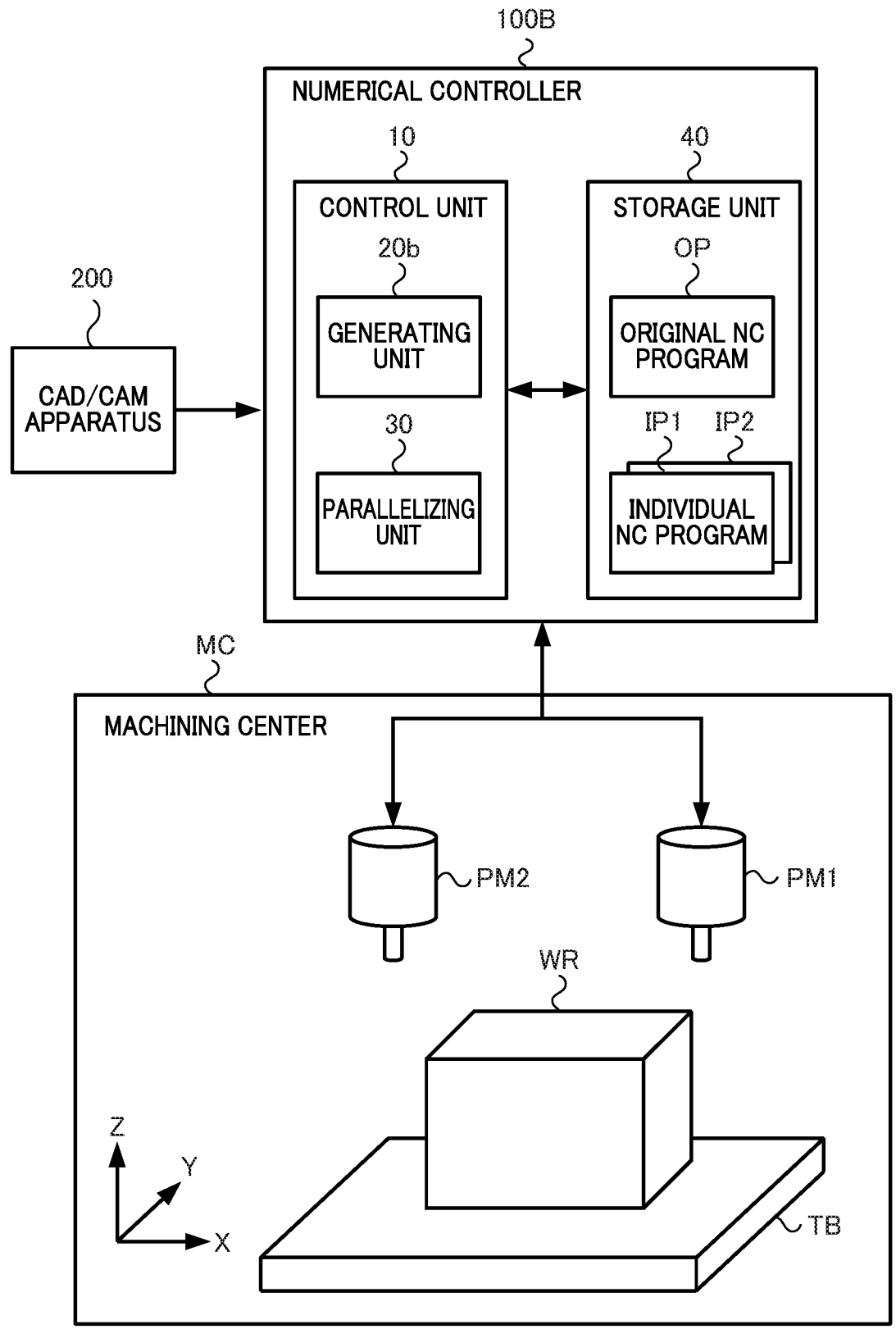
FIG. 8 is a diagram illustrating one example of a numerical controller according to a third embodiment of the present invention.

FIG. 8 is a diagram illustrating one example of a numerical controller according to the third embodiment of the present invention. It is noted that the elements in FIG. 8 having the same functions as the elements of the numerical controller 100 according to the first embodiment are denoted by the same reference numerals, and the detailed descriptions thereof are omitted.

A numerical controller 100B according to the third embodiment has the same configuration as that of the numerical controller 100 according to the first embodiment.

In the case where an acceleration/deceleration time constant and/or a cutting feed rate are/is set in advance for each machine and the required machining speed varies at machining points in the machining path of the original NC program OP, the numerical controller 100B divides the path into a plurality of paths so as to correspond to respective machines achieving the required machining speeds. The numerical controller 100B generates a plurality of the individual NC programs IP1, IP2 indicating the machining paths of a plurality of the machines PM1, PM2 on the basis of the respective divided machining paths. Accordingly, the control unit 10 executes the program of numerical control processing stored in the storage unit 40, thereby functioning as a generating unit 20b and the parallelizing unit 30.

In an example, upon the reception of the instruction input by an operator or the like through an input device included in the numerical controller 100B, the generating unit 20b reads, from the storage unit 40, the original NC program OP received from the CAD/CAM apparatus 200. Herein, the instruction input by an operator or the like includes the time constant information indicating the acceleration/deceleration time constants to be set in the machines PM1, PM2, respectively. In an example, a small acceleration/deceleration time constant (that is, high responsiveness at the time of acceleration/deceleration) such as of 50 ms and/or a high cutting feed rate are/is set in the machine PM1. A large acceleration/deceleration time constant (that is, low responsiveness at the time of acceleration/deceleration) such as of 60 ms and/or a low cutting feed rate are/is set in the machine PM2. In the case where a tool such as a blade is attached, a high cutting feed rate such as of 60 m/min and a low cutting feed rate such as of 40 m/min may be set in the machine PM1 and the machine PM2, respectively.

The generating unit 20b generates the individual NC programs IP1, IP2 for the respective machines PM1, PM2 so that the machines PM1, PM2 operate cooperatively, on the basis of the machining path indicated by the read original NC program OP.

More specifically, the generating unit 20b decodes a G code for each block of the original NC program OP, and acquires command information such as on the XYZ coordinate of a set destination and a feed rate. The generating unit 20b calculates the machining paths P (t, X(t), Y(t), Z(t)) indicated by the original NC program OP, by use of the acquired command information. The generating unit 20b further calculates the required time constants (required accelerations) and/or the required speeds required by a machine in the machining paths P of the times t (t, X(t), Y(t), Z(t)), by use of the command information. The generating unit 20b determines whether or not the required time constant (required acceleration) and/or the required speed calculated in the machining paths P (t, X(t), Y(t), Z(t)) are/is achieved by the acceleration/deceleration time constant of the machine PM1, and whether or not the required time constant and/or the required speed are/is achieved not only by acceleration/deceleration time constant of the machine PM1 but also by that of the machine PM2.

The generating unit 20b stores, in the storage unit 40 as the machining path data on the machine PM1, the machining path P (t, X(t), Y(t), Z(t)) whose required time constant (required acceleration) and/or required speed are/is determined to be achieved by the acceleration/deceleration time constant and/or the cutting feed rate of the machine PM1, among the machining paths P of respective times t (t, X(t), Y(t), Z(t)). The generating unit 20b stores, in the storage unit 40 as the machining path data on the machine PM2, the machining path P (t, X(t), Y(t), Z(t)) whose required time constant (required acceleration) and/or required speed are/is determined to be achieved not only by the machine PM1 but also by the machine PM2. The generating unit 20b then generates the individual NC programs IP1, IP2 for the respective machines PM1, PM2, by use of the machining path data on the respective machines PM1, PM2, on the basis of the determination result in the parallelization processing executed by the parallelizing unit 30. The generating unit 20b thereafter stores the generated individual NC programs IP1, IP2 for the machines PM1, PM2 in the storage unit 40.

The parallelizing unit 30 has the same function as that of the parallelizing unit 30 in the first embodiment.

Figure 9:
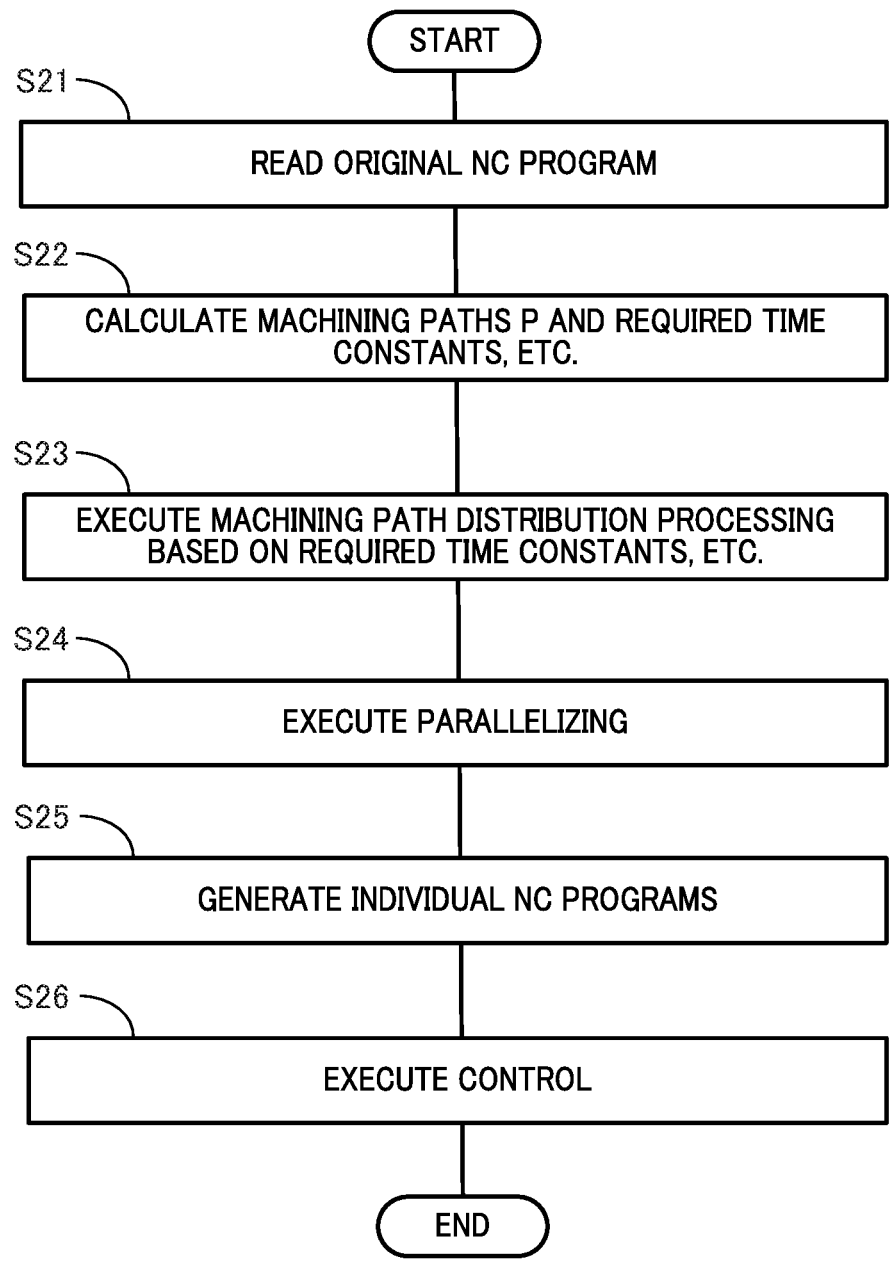
FIG. 9 is a diagram indicating one example of numerical control processing in the numerical controller according to the third embodiment.

FIG. 9 is a diagram indicating one example of the numerical control processing in the numerical controller 100B according to the third embodiment. The processing shown in FIG. 9 is different from the processing in the first embodiment shown in FIG. 3, in that the machining path data on the machines PM1, PM2 is generated according to the required machining speeds at the machining points of the workpiece WR, and thereafter the individual NC programs IP1, IP2 for the machines PM1, PM2 are generated.

It is noted that the processing shown in FIG. 9 is to be executed upon, for example, the operation by an operator or the like through the input device of the numerical controller 100B. The numerical controller 100B also receives the instruction input by an operator or the like through the input device, including the time constant information indicating the acceleration/deceleration time constants to be set in the machines PM1, PM2, respectively.

In step S21, the generating unit 20b reads, from the storage unit 40, the original NC program OP received from the CAD/CAM apparatus 200.

In step S22, the generating unit 20b decodes a G code for each block of the original NC program OP read in step S21, and acquires command information such as on the XYZ coordinate of a set destination and a feed rate. The generating unit 20b calculates the machining paths P (t, X(t), Y(t), Z(t)) indicated by the original NC program OP, by use of the acquired command information. The generating unit 20b further calculates the required time constants (required acceleration) and/or the required speeds in the machining paths P of the times t (t, X(t), Y(t), Z(t)), by use of the acquired command information.

In step S23, the generating unit 20b executes the machining path distribution processing, by use of the machining paths P (t, X(t), Y(t), Z(t)) and the required time constants (required acceleration) and/or the required speeds, calculated in step S22. It is noted that the machining path distribution processing will be described with reference to FIG. 10.

In step S24, the parallelizing unit 30 executes the same processing as the operation in which step S3 is replaced with step S23 in the processing described in step S4 in the first embodiment.

In step S25, as in step S5 in the first embodiment, the generating unit 20b generates the individual NC programs IP1, IP2 for the respective machines PM1, PM2, by use of the machining path data on the respective machines PM1, PM2, on the basis of the adjustment result in step S24.

In step S26, as in step S6 in the first embodiment, the control unit 10 executes in parallel the individual NC programs IP1, IP2 generated in step S25, and controls the machining executed to the single workpiece WR by the respective machines PM1, PM2.

Figure 10:
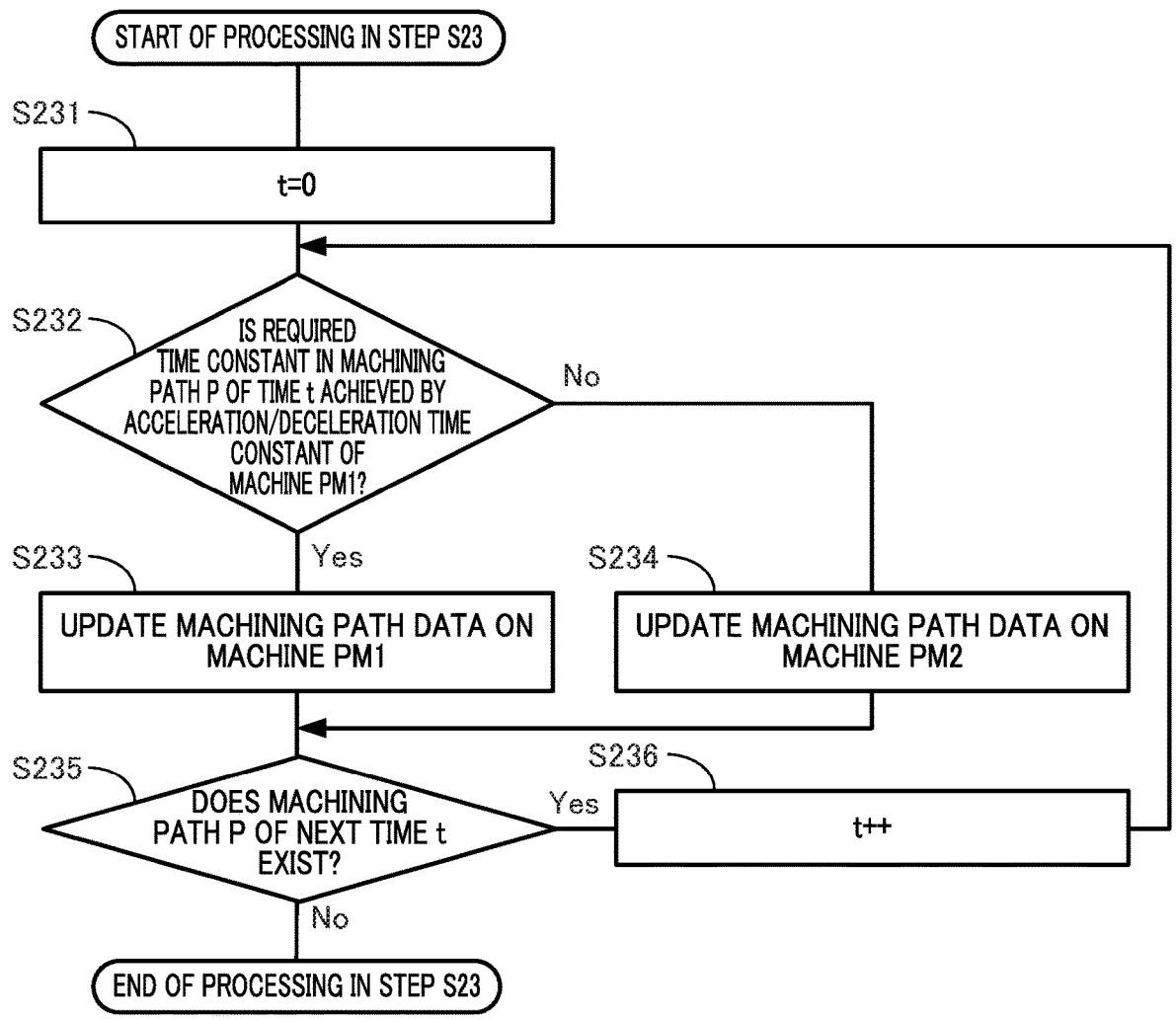
FIG. 10 is a diagram indicating one example of machining path distribution processing of step S23 shown in FIG. 9.

FIG. 10 is a diagram indicating one example of the machining path distribution processing in step S23 shown in FIG. 9. In step S231, the generating unit 20b resets the time t to 0.

In step S232, the generating unit 20b determines whether or not the required time constant (required acceleration) and/or the required speed in the machining path P of the time t (t, X(t), Y(t), Z(t)) are/is achieved by the acceleration/deceleration time constant of the machine PM1. In the case where the required time constant (required acceleration) and/or the required speed in the machining path P of the time t (t, X(t), Y(t), Z(t)) are/is determined to be achieved only by the acceleration/deceleration time constant of the machine PM1, the processing to be executed by the numerical controller 100B proceeds to step S233. In the case where the required time constant (required acceleration) and/or the required speed in the machining path P of the time t (t, X(t), Y(t), Z(t)) are/is determined to be achieved not only by the acceleration/deceleration time constant of the machine PM1 but also that of the machine PM2, the processing to be executed by the numerical controller 100B proceeds to step S234.

In step S233, the generating unit 20b adds the machining path P of the time t (t, X(t), Y(t), Z(t)) determined in step S232 into the machining path data on the machine PM1, and updates the data.

In step S234, the generating unit 20b adds the machining path P of the time t (t, X(t), Y(t), Z(t)) determined in step S232 into the machining path data on the machine PM2, and updates the data.

In step S235, the generating unit 20b determines whether or not the machining path P of the next time t exists. In the case where the machining path P of the next time t exists, the processing to be executed by the numerical controller 100B proceeds to step S236. In the case where the machining path P of the next time t does not exist, the machining path distribution processing ends, and the processing to be executed by the numerical controller 100B proceeds to step S24 shown in FIG. 9.

In step S236, the generating unit 20b increases the time t by one control cycle time, and the processing to be executed by the numerical controller 100B proceeds to step S232.

As described above, in the third embodiment, the numerical controller 100B generates the machining path data on the machines PM1, PM2, on the basis of the required time constants (required accelerations) and/or the required speeds in the machining paths P of respective times t (t, X(t), Y(t), Z (t)) to the machining to the single workpiece WR. The numerical controller 100B simulates the operations of the machines PM1, PM2 on the basis of the generated machining path data on the machines PM1, PM2, and determines whether or not interference occurs when the machines PM1, PM2 operate cooperatively. The numerical controller 100B then generates the individual NC programs IP1, IP2 for the respective machines PM1, PM2, on the basis of the machining path data on the machines PM1, PM2 and the determination result.

As a result, as in the first embodiment, the numerical controller 100B is able to generate the specific individual NC programs IP1, IP2 for the machines PM1, PM2 from the one original NC program OP to the single workpiece WR, thereby enabling to make the machines PM1, PM2 perform machining cooperatively. In the third embodiment, the numerical controller 100B further makes the machines PM1, PM2 achieving the required time constants (required accelerations) and/or the required speeds perform machining cooperatively, according to the required time constants (required accelerations) and/or the required speeds at the machining points of the single workpiece WR. Accordingly, the numerical controller 100B achieves both of the machining accuracies and the machining speeds in the machining to the single workpiece WR.

Further, as in the first embodiment, in the individual NC programs IP1, IP2 for the machines PM1, PM2, the operations of the machines PM1, PM2 are to be adjusted according to the determination result such as of interference between the machines PM1, PM2. This allows to improve the efficiency in machining by the numerical controller 100B, thereby reducing the cycle time.

The third embodiment has been described so far.

Fourth Embodiment

The fourth embodiment is described below. In the fourth embodiment, an acceleration/deceleration time constant and/or a cutting feed rate are/is set in advance for each machine, and the machining path of the first machining program is divided into a plurality of paths, so as to correspond to a low frequency component and a high frequency component. In the fourth embodiment, a plurality of second machining programs indicating the machining paths respectively of the plurality of machines are generated on the basis of the respective divided machining paths. In the fourth embodiment, unlike the first embodiment to the third embodiment, in an example, one machine executes base machining by the second machining program corresponding to a low frequency component, and the other machine executes intricate-shape machining by the second machining program corresponding to a high frequency component, while following the one machine.

Figure 11:
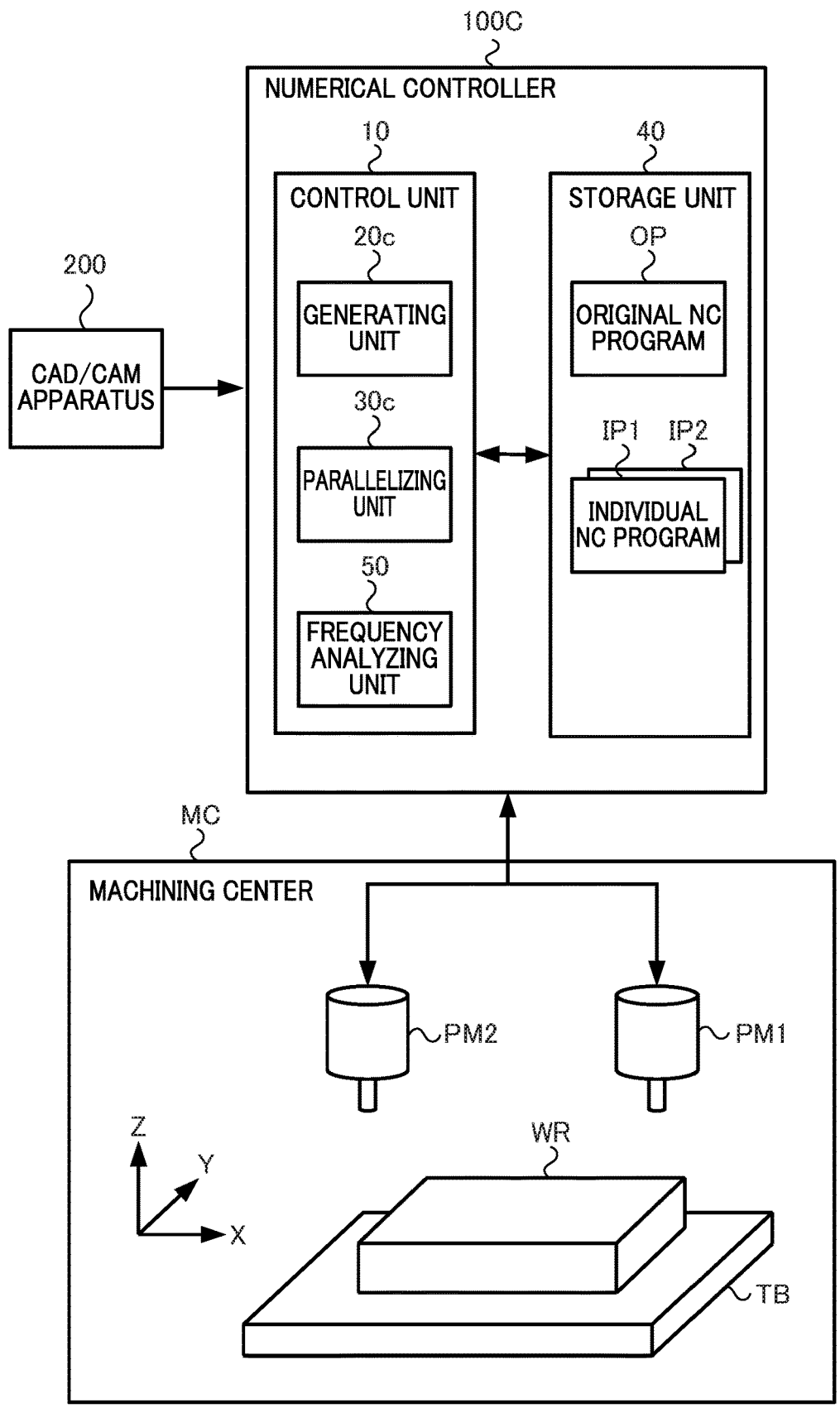
FIG. 11 is a diagram illustrating one example of a numerical controller according to a fourth embodiment of the present invention.

FIG. 11 is a diagram illustrating one example of a numerical controller according to the fourth embodiment of the present invention. It is noted that the elements in FIG. 11 having the same functions as the elements of the numerical controller 100 according to the first embodiment are denoted by the same reference numerals, and the detailed descriptions thereof are omitted. The single workpiece WR to be machined by the machining center MC has a longer length in the X-axis direction, compared to those in the Y-axis and Z-axis directions, as an example.

A numerical controller 100C according to the fourth embodiment has the same configuration as that of the numerical controller 100 according to the first embodiment.

In the numerical controller 100C, an acceleration/deceleration time constant and/or a cutting feed rate are/is set in advance for each machine, and the machining path of the original NC program OP is divided into a plurality of paths so as to correspond to a low frequency component and a high frequency component. The numerical controller 100C generates the plurality of individual NC programs IP1, IP2 indicating the machining paths respectively of the plurality of machines PM1, PM2 on the basis of the respective divided machining paths. Accordingly, the control unit 10 executes the program of numerical control processing stored in the storage unit 40, thereby functioning as a generating unit 20c and a parallelizing unit 30c.

In an example, upon the reception of the instruction input by an operator or the like through an input device included in the numerical controller 100C, the generating unit 20c reads, from the storage unit 40, the original NC program OP received from the CAD/CAM apparatus 200. Herein, the instruction input by an operator or the like includes the time constant information indicating the acceleration/deceleration time constants to be set in the machines PM1, PM2, respectively. In an example, a large acceleration/deceleration time constant (that is, low responsiveness at the time of acceleration/deceleration) such as of 50 ms is set in the machine PM1. A small acceleration/deceleration time constant (that is, high responsiveness at the time of acceleration/deceleration) such as of 20 ms is set in the machine PM2. In the case where a tool such as a blade is attached, a low cutting feed rate such as of 30 m/min and a high cutting feed rate such as of 40 m/min may be set in the machines PM1, PM2.

The generating unit 20c generates the individual NC programs IP1, IP2 for the respective machines PM1, PM2 so that the machines PM1, PM2 operate cooperatively, on the basis of the machining path indicated by the read original NC program OP.

More specifically, the generating unit 20c decodes a G code for each block of the original NC program OP, and acquires command information such as on the XYZ coordinate of a set destination and a feed rate. The generating unit 20c calculates the machining paths P (t, X(t), Y(t), Z(t)) indicated by the original NC program OP, by use of the acquired command information.

The generating unit 20c stores, in the storage unit 40, the low frequency components of the machining paths P acquired in the frequency analysis processing executed by a frequency analyzing unit 50 to be described below, as the machining path data on the machine PM1 which does not require high responsiveness in base machining or the like and in which a large acceleration/deceleration time constant (low responsiveness at the time of acceleration/deceleration) is set. The generating unit 20c stores, in the storage unit 40, the high frequency components of the machining paths P, as the machining path data on the machine PM2 which requires high responsiveness in intricate-shape machining, finishing or the like and in which a small acceleration/deceleration time constant (high responsiveness at the time of acceleration/deceleration) is set.

The generating unit 20c generates the individual NC programs IP1, IP2 for the respective machines PM1, PM2, by use of the machining path data on the respective machines PM1, PM2, on the basis of the determination result in the parallelization processing performed by the parallelizing unit 30c. The generating unit 20c stores the generated individual NC programs IP1, IP2 for the machines PM1, PM2 in the storage unit 40.

The frequency analyzing unit 50 executes the frequency analysis processing using a low path filter (hereinafter, also referred to as "low path filtering"), to each of X(t), Y(t) and Z(t) of the machining paths P of respective times t calculated by the generating unit 20c. The frequency analyzing unit 50 calculates low frequency components XL(t), YL(t) and ZL(t) of the machining paths P. For example, an IIR (infinite impulse response) filter well known to those skilled in the art is used as the low pass filter. The IIR filter is expressed as in, for example, a formula (1). It is noted that the formula (1) indicates a component X of the machining path P, and a component Y and a component Z are also indicated in the same manner. Alternatively, other low pass filters than the IIR filter may be used.

$$XL(t)=A0*X(t)+A1*X(t-\Delta t)+B1*XL(t-\Delta t) \quad \text{Formula (1)}$$

In the formula (1), t denotes a time, and Δt denotes one control cycle time. XL(t) denotes a low frequency component in the X axis direction of the machining path P. A0, A1 and B1 are constants, and are set to satisfy A0=A1 and A0+A1+B1=1, so that the formula (1) functions as a low pass filter. The cut-off frequency in the formula (1) is preferably determined as appropriate, according to the acceleration/deceleration time constants or the like set in the machine PM1, PM2.

The frequency analyzing unit 50 calculates high frequency components XH(t), YH(t) and ZH(t) of the machining path P, by use of a formula (2). It is noted that the formula (2) indicates a high frequency component XH(t), and a high frequency component YH(t) and a high frequency component ZH(t) are also indicated in the same manner.

$$XH(t)=X(t)-XL(t) \quad \text{Formula (2)}$$

The parallelizing unit 30c parallelizes machining so that the machining by the machine PM2 follows the machining by the machine PM1. Therefore, in order to prevent the interference, the parallelizing unit 30c may parallelize machining in the manner that, after the machine PM1 starts the machining, the machine PM2 starts the machining after waiting for a predetermined period of time so as not to interfere with the machine PM1.

Figure 12:
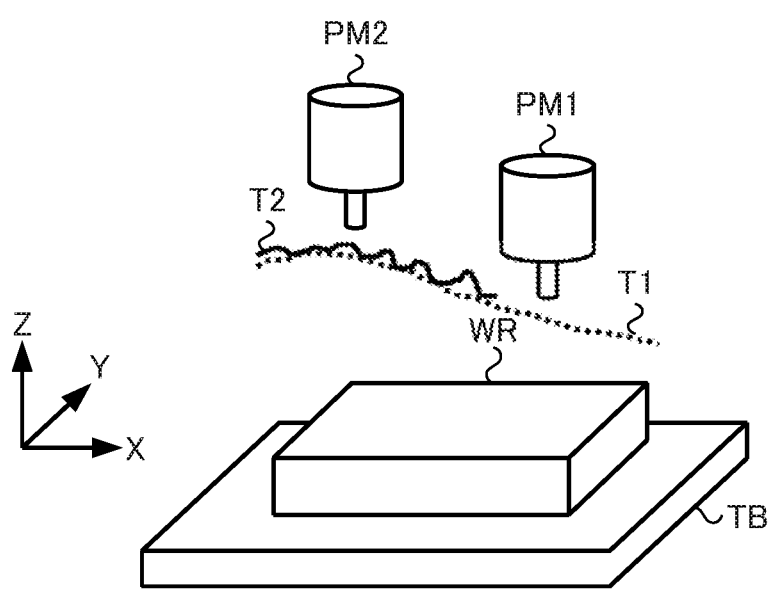
FIG. 12 is a diagram illustrating one example of machining paths by machines.

As described above, in the machining to the workpiece WR, the machine PM1 in which a large acceleration/deceleration time constant (that is, low responsiveness at the time of acceleration/deceleration) is set executes base machining to the workpiece WR. The machine PM2 in which a small acceleration/deceleration time constant (that is, high responsiveness at the time of acceleration/deceleration) is set executes intricate-shape machining while following the machine PM1. This allows to improve the efficiency in machining by the numerical controller 100C. FIG. 12 shows that the machine PM2 follows the machining by the machine PM1. As shown in FIG. 12, particularly in the machining to a long workpiece, the machine PM1 executes base machining, and the machine PM2 in which a small acceleration/deceleration time constant (that is, high responsiveness at the time of acceleration/deceleration) is set executes intricate-shape machining in the area requiring the edge thereof to move greatly, while following the machine PM1.

FIG. 12 is a diagram illustrating one example of a machining path T1 and a machining path T2 of the machines PM1, PM2. In FIG. 12, the machining path T1 of the machine PM1 in which a large acceleration/deceleration time constant (low responsiveness at the time of acceleration/deceleration) is set corresponds to the machining path for a low frequency component requiring less movement, indicated by a broken line. The machining path T2 of the machine PM2 in which a small acceleration/deceleration time constant (high responsiveness at the time of acceleration/deceleration) is set corresponds to the machining path for a high frequency component requiring great movement, indicated by a solid line, while following the machine PM1.

Figure 13:
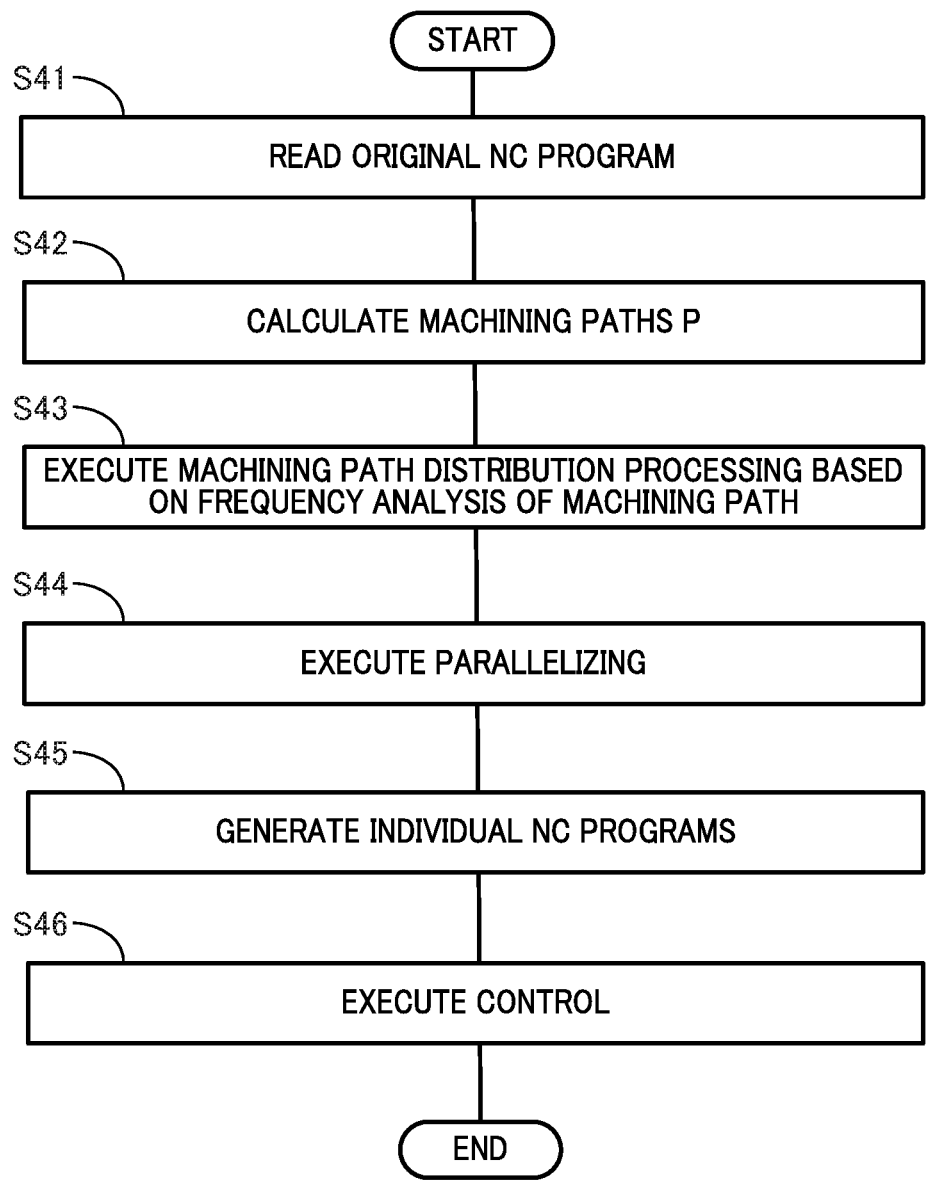
FIG. 13 is a diagram indicating one example of numerical control processing in the numerical controller according to the fourth embodiment.

FIG. 13 is a diagram indicating one example of the numerical control processing in the numerical controller 100C according to the fourth embodiment. The processing shown in FIG. 13 is different from the processing in the first embodiment shown in FIG. 3, in that a low frequency component and a high frequency component in the machining path P are calculated, and the machining path data on the machines PM1, PM2 is generated.

It is noted that the processing shown in FIG. 13 is to be executed upon, for example, the operation by an operator or the like through the input device of the numerical controller 100C.

In step S41, the generating unit 20c reads, from the storage unit 40, the original NC program OP received from the CAD/CAM apparatus 200.

In step S42, the generating unit 20c decodes a G code for each block of the original NC program OP read in step S41, and acquires command information such as on the XYZ coordinate of a set destination and a feed rate. The generating unit 20c calculates the three-dimensional machining paths P (t, X(t), Y(t), Z(t)) indicated by the original NC program OP, by use of the acquired command information.

In step S43, the generating unit 20c executes the machining path distribution processing, by use of the machining paths P (t, X(t), Y(t), Z(t)) calculated in step S42, on the basis of the frequency analysis of the machining path. It is noted that the machining path distribution processing will be described below with reference to FIG. 14.

In step S44, the parallelizing unit 30c adjusts the timing of starting the machining of the machine PM2 to prevent the machine PM1 and the machine PM2 from interfering mutually, so that after the machine PM1 starts the machining, the machine PM2 starts the machining after waiting for a predetermined period of time so as not to interfere with the machine PM1.

In step S45, as in step S5 in the first embodiment, the generating unit 20c generates the individual NC programs IP1, IP2 for the respective machines PM1, PM2, by use of the machining path data on the respective machines PM1, PM2, on the basis of the adjustment result in step S44.

In step S46, as in step S6 in the first embodiment, the control unit 10 executes in parallel the individual NC programs IP1, IP2 generated in step S45, and controls the machining executed to the single workpiece WR by the respective machines PM1, PM2.

Figure 14:
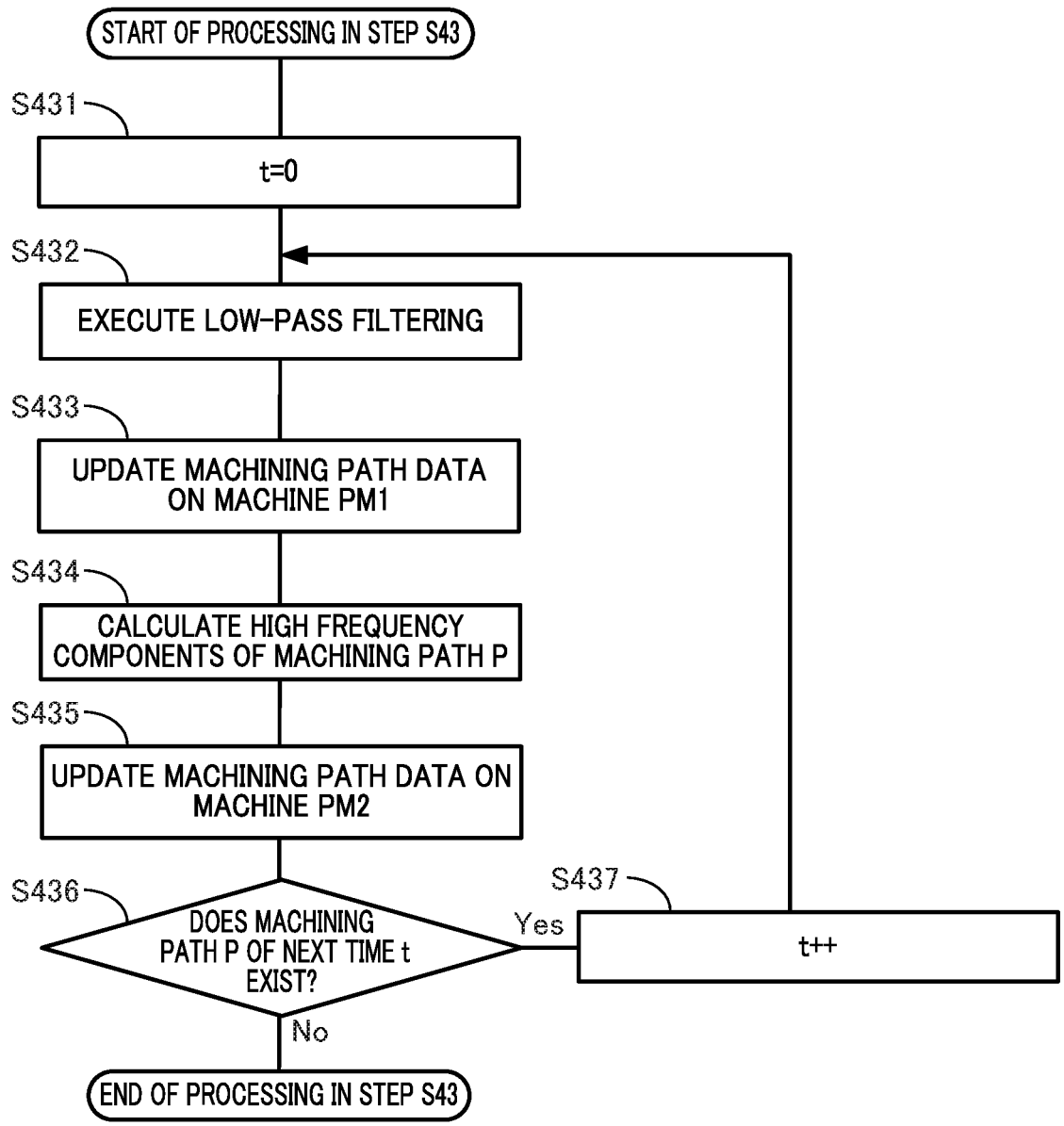
FIG. 14 is a diagram indicating one example of machining path distribution processing of step S43 shown in FIG. 13.

FIG. 14 is a diagram indicating one example of the machining path distribution processing of step S43 shown in FIG. 13.

In step S431, the generating unit 20c resets the time t to 0.

In step S432, the frequency analyzing unit 50 executes low-pass filtering to X(t), Y(t) and Z(t) of the machining path P of the time t, by use of the formula (1), to calculate the low frequency components XL(t), YL(t), ZL(t) of the machining path P.

In step S433, the generating unit 20c adds the low frequency components XL(t), YL(t), ZL(t) of the machining path P of the time t calculated in step S432, into the machining path data on the machine PM1 which does not require high responsiveness and in which a large acceleration/deceleration time constant (low responsiveness at the time of acceleration/deceleration) is set, and updates the data.

In step S434, the frequency analyzing unit 50 calculates the high frequency components XH(t), YH(t) and ZH(t) of the machining path P, by use of the formula (2).

In step S435, the generating unit 20c adds the high frequency components XH(t), YH(t) and ZH(t) of the machining path P of the time t calculated in step S434, into the machining path data on the machine PM2 which requires high responsiveness and in which a small acceleration/deceleration time constant (high responsiveness at the time of acceleration/deceleration) is set, and updates the data.

In step S436, the generating unit 20c determines whether or not the machining path P of the next time t exists. In the case where the machining path P of the next time t exists, the processing to be executed by the numerical controller 100C proceeds to step S437. In the case where the machining path P of the next time t does not exist, the machining path distribution processing ends, and the processing to be executed by the numerical controller 100C proceeds to step S44 shown in FIG. 13.

In step S437, the generating unit 20c increases the time t by one control cycle time, and the processing to be executed by the numerical controller 100C proceeds to step S432.

As described above, in the fourth embodiment, the numerical controller 100C executes low-pass filtering to the machining paths P of respective times t (t, X(t), Y(t), Z(t)), and calculates the low frequency components and the high frequency components of the machining paths P. The numerical controller 100C generates the machining path data on the machines PM1, PM2 according to the acceleration/deceleration time constants set in the machines PM1, PM2, by use of the calculated low frequency components and the calculated high frequency components of the machining paths P. The numerical controller 100C simulates the operations of the machines PM1, PM2 on the basis of the generated machining path data on the machines PM1, PM2, and determines whether or not interference occurs when the machines PM1, PM2 operate cooperatively. The numerical controller 100C then generates the individual NC programs IP1, IP2 for the respective machines PM1, PM2, on the basis of the machining path data on the machines PM1, PM2 and the determination result.

As a result, the machine PM1 is able to execute, for example, base machining to a long workpiece by the individual NC program IP1 corresponding to a low frequency component, and the other machine PM2 is able to execute intricate-shape machining by the individual NC program IP2 corresponding to a high frequency component, while following the machine PM1. This allows to keep the machining accuracy and further to improve the efficiency in machining.

As in the first embodiment, In the individual NC programs IP1, IP2 for the machines PM1, PM2, the operations of the machines PM1, PM2 are to be adjusted according to the determination result such as of interference between the machines PM1, PM2. This allows to improve the efficiency in machining by the numerical controller 100C, thereby reducing the cycle time.

The fourth embodiment has been described so far.

Fifth Embodiment

The fifth embodiment is described below. In the fifth embodiment, an acceleration/deceleration time constant and/or a cutting feed rate are/is set in advance for each machine, and the machining surface is divided into a low area in which spatial frequencies are low, and a high area in which spatial frequencies are high, on the basis of the spatial frequency distribution of the machining surface. In the fifth embodiment, the machining path of the first machining program is divided into a plurality of paths so as to correspond to the low area and the high area, and a plurality of second machining programs indicating the machining paths respectively of the plurality of machines are generated on the basis of the respective divided machining paths. In the fifth embodiment, as in the first embodiment, each machine is in charge of machining for each machining area. The machine having high responsiveness executes machining on the machining surface requiring a lot of intricate shapes corresponding to high frequency components, and the other machine executes machining on the machining surface requiring a lot of shapes corresponding to low frequency components. Accordingly, the machine having high responsiveness executes machining on the machining surface corresponding to high frequency components, thereby enabling to ensure the quality on the surface and improve the efficiency in machining as a whole.

Figure 15:
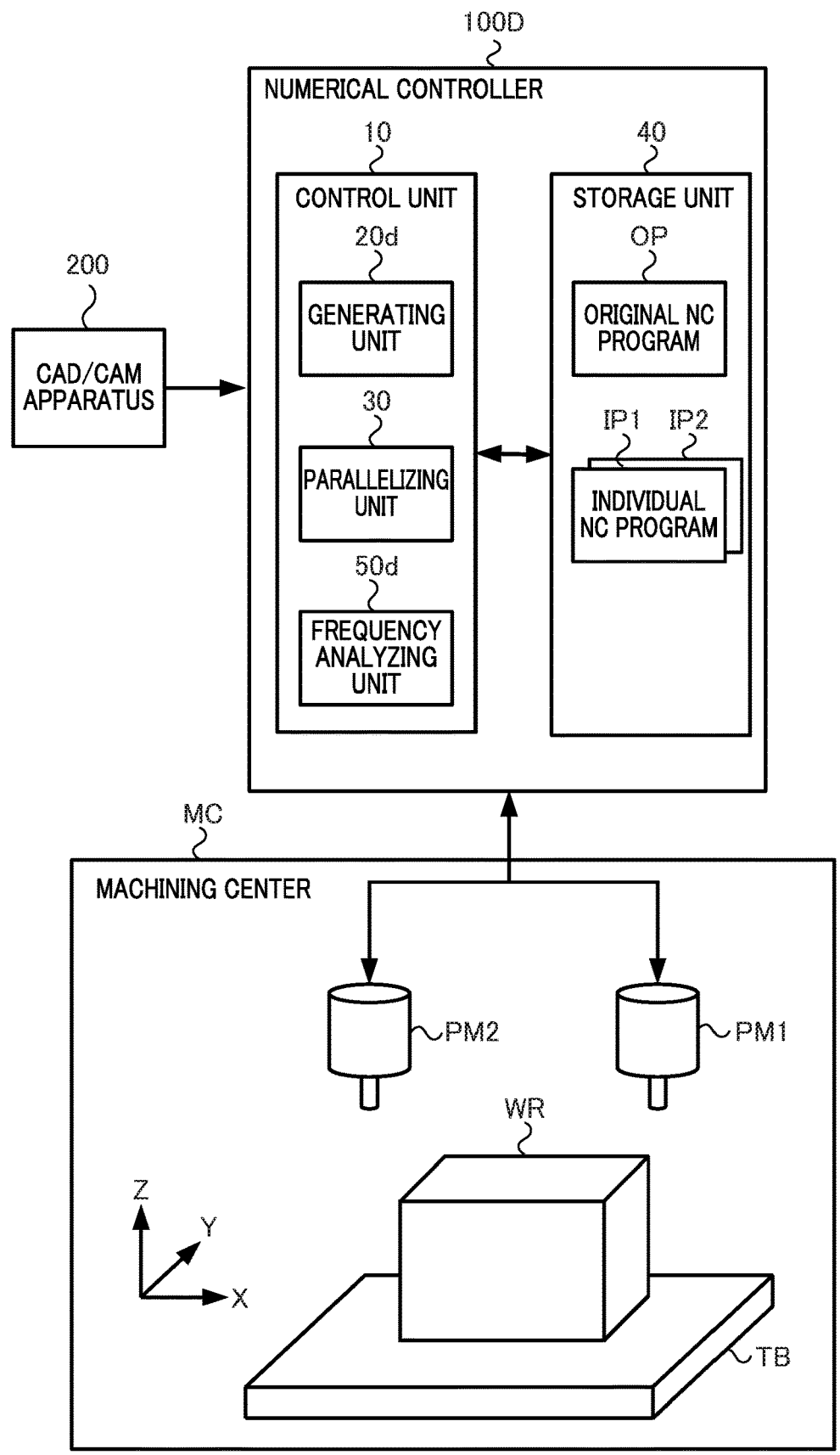
FIG. 15 is a diagram illustrating one example of a numerical controller according to a fifth embodiment of the present invention.

FIG. 15 is a diagram illustrating one example of a numerical controller according to the fifth embodiment of the present invention. It is noted that the elements in FIG. 15 having the same functions as the elements of the numerical controller 100 according to the first embodiment are denoted by the same reference numerals, and the detailed descriptions thereof are omitted.

A numerical controller 100D according to the fifth embodiment has the same configuration as that of the numerical controller 100 according to the first embodiment.

In an example, the numerical controller 100D receives, from the CAD/CAM apparatus 200, not only the original NC program OP but also the CAD data indicating the machining surface shape such as of a product or a component to be formed from the single workpiece WR, and stores them in the storage unit 40.

In the numerical controller 100D, an acceleration/deceleration time constant and/or a cutting feed rate are/is set in advance for each machine, and the machining surface is divided into the low area in which spatial frequencies are low, and the high area in which spatial frequencies are high, on the basis of the spatial frequency distribution of the machining surface. The numerical controller 100D divides the machining path of the original NC program OP into a plurality of paths so as to correspond to the low area and the high area, and generates the plurality of individual NC programs IP1, IP2 indicating the machining paths respectively of the plurality of machines PM1, PM2, on the basis of the respective divided machining paths. Accordingly, the control unit 10 executes the program of numerical control processing stored in the storage unit 40, thereby functioning as a generating unit 20d, the parallelizing unit 30, and a frequency analyzing unit 50d.

In an example, upon the reception of the instruction input by an operator or the like through an input device included in the numerical controller 100D, the generating unit 20d reads, from the storage unit 40, the original NC program OP received from the CAD/CAM apparatus 200. Herein, the instruction input by an operator or the like includes the time constant information indicating the acceleration/deceleration time constants to be set in the machines PM1, PM2, respectively. In an example, a large acceleration/deceleration time constant (that is, low responsiveness at the time of acceleration/deceleration) such as of 50 ms and/or a low cutting feed rate are/is set in the machine PM1. A small acceleration/deceleration time constant (that is, high responsiveness at the time of acceleration/deceleration) such as of 20 ms and/or a high cutting feed rate are/is set in the machine PM2. In the case where a tool such as a blade is attached, a low cutting feed rate such as of 30 m/min and a high cutting feed rate such as of 40 m/min may be set in the machines PM1, PM2.

The generating unit 20d generates the individual NC programs IP1, IP2 for the respective machines PM1, PM2 so that the machines PM1, PM2 operate cooperatively, on the basis of the machining path indicated by the read original NC program OP.

More specifically, the generating unit 20d decodes a G code for each block of the read original NC program OP, and acquires command information such as on the XYZ coordinate of a set destination and a feed rate. The generating unit 20d calculates the machining paths P (t, X(t), Y(t), Z(t)) indicated by the original NC program OP, by use of the acquired command information.

The generating unit 20d stores, in the storage unit 40, the machining paths P (t, X(t), Y(t), Z(t)) to the machining surface of the low spatial frequency components among the spatial frequencies of the machining surface shape acquired in the frequency analysis processing performed by the frequency analyzing unit 50d to be described below, as the machining path data on the machine PM1 which does not require high responsiveness and in which a large acceleration/deceleration time constant (low responsiveness at the time of acceleration/deceleration) is set. The generating unit 20d stores, in the storage unit 40, the machining paths P (t, X(t), Y(t), Z(t)) to the machining surface of the high spatial frequency components, as the machining path data on the machine PM2 which requires high responsiveness and in which a small acceleration/deceleration time constant (high responsiveness at the time of acceleration/deceleration) is set.

The generating unit 20d generates the individual NC programs IP1, IP2 for the respective machines PM1, PM2, by use of the machining path data on the respective machines PM1, PM2, on the basis of the determination result in the parallelization processing performed by the parallelizing unit 30. The generating unit 20d thereafter stores the generated individual NC programs IP1, IP2 for the machines PM1, PM2 in the storage unit 40.

The frequency analyzing unit 50d reads CAD data from the storage unit 40. The frequency analyzing unit 50d executes two-dimensional DFT (discrete fourier transform) processing as frequency analysis processing to two-dimensional data on the machining surface shape on the XY plane corresponding to the plane of the table TB on which the workpiece WR is disposed, among the read CAD data. The frequency analyzing unit 50d calculates the two-dimensional distribution of spatial frequencies (hereinafter, also referred to as "spatial frequency distribution") in the machining surface shape on the XY plane. It is noted that the frequency analyzing unit 50d executes the two-dimensional DFT processing to the two-dimensional data on the machining surface shape on the YZ plane in the case where the plane of the table TB is parallel to the YZ plane, and executes the DFT processing to the two-dimensional data on the machining surface shape on the ZX plane in the case where the plane of the table TB is parallel to the ZX plane.

In an example, the frequency analyzing unit 50d divides the calculated spatial frequency distribution into the area in which spatial frequency components are low and the area in which spatial frequency components are high, on the basis of the specified value determined corresponding to the acceleration/deceleration time constants of the machines PM1, PM2. The frequency analyzing unit 50d executes two-dimensional IDFT (inverse discrete fourier transform) processing as frequency analysis processing, to the area in which spatial frequency components are low, and calculates the distribution of low spatial frequencies on the XY plane. The frequency analyzing unit 50d executes the two-dimensional IDFT processing to the area in which spatial frequency components are high, and calculates the distribution of high spatial frequencies on the XY plane.

The parallelizing unit 30 has the same function as that of the parallelizing unit 30 in the first embodiment.

Figure 16:
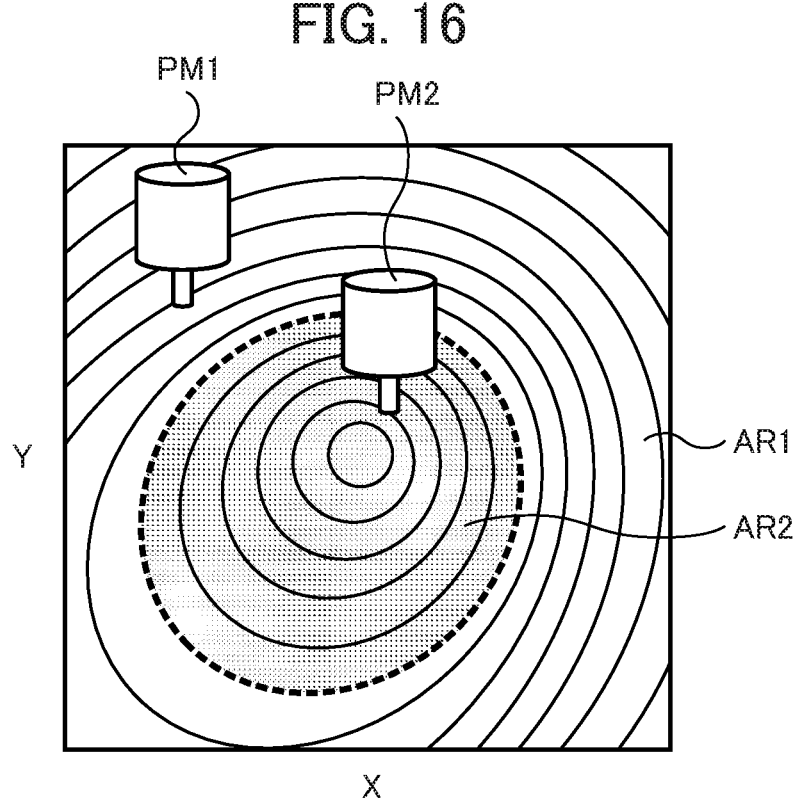
FIG. 16 is a diagram illustrating one example of spatial frequency distribution on the XY plane.

As described above, in the machining to the workpiece WR, the machine PM1 in which a large acceleration/deceleration time constant (that is, low responsiveness at the time of acceleration/deceleration) is set executes the machining in the low area in which the spatial frequencies on the machining surface are low. The machine PM2 in which a small acceleration/deceleration time constant (that is, high responsiveness at the time of acceleration/deceleration) is set executes the machining in the high area in which the spatial frequencies on the machining surface are high. This allows to improve the efficiency in machining by the numerical controller 100D. FIG. 16 shows that the machine PM2 executes the machining in the high area in which the spatial frequencies on the machining surface are high, and that the machine PM1 executes the machining in the low area in which the spatial frequencies on the machining surface are low. Accordingly, the machine having low responsiveness is made to execute the machining on the machining surface of the low area corresponding to the low spatial frequency components, and the machine having high responsiveness is made to execute the machining on the machining surface corresponding to high frequency components, thereby enabling to ensure the quality on the machining surface and improve the efficiency in machining as a whole.

FIG. 16 is a diagram illustrating one example of the spatial frequency distribution on the XY plane. In the spatial frequency distribution shown in FIG. 16, the broken line indicates the contour line corresponding to the specified value. A shaded area AR2 indicates the machining surface of the high area in which frequencies are higher than the specified value. The other area AR1 indicates the machining surface of the low area in which frequencies are identical to or lower than the specified value.

Figure 17:
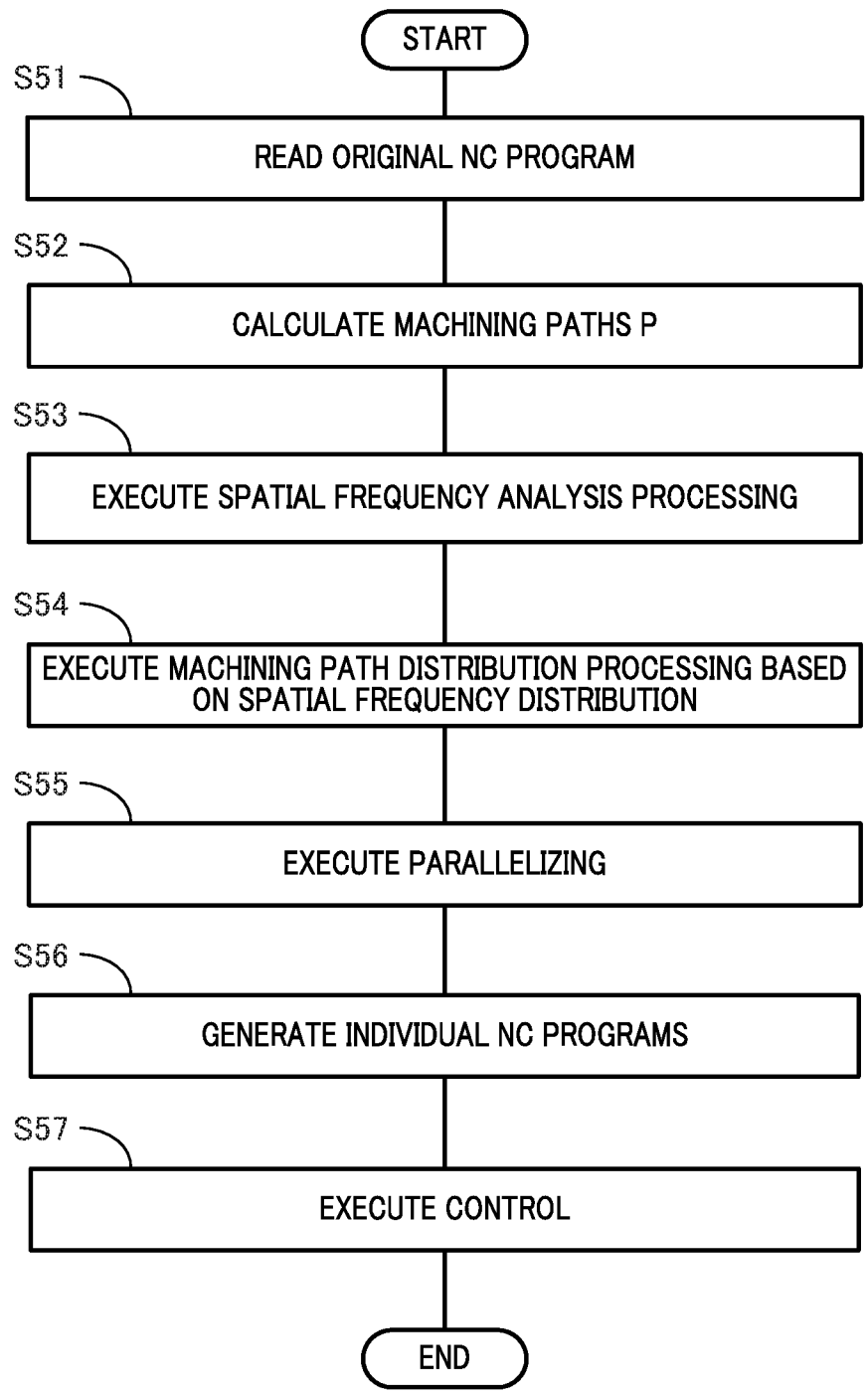
FIG. 17 is a diagram indicating one example of numerical control processing in the numerical controller according to the fifth embodiment.

FIG. 17 is a diagram indicating one example of the numerical control processing performed by the numerical controller 100D according to the fifth embodiment. The processing shown in FIG. 17 is different from the processing in the first embodiment shown in FIG. 3, in that the machining path data on the machines PM1, PM2 is generated according to the spatial frequencies in the shapes at the machining points of the workpiece WR.

The processing shown in FIG. 17 is to be executed upon, for example, the operation by an operator or the like through the input device of the numerical controller 100D. The numerical controller 100D also receives the instruction, input by an operator or the like through the input device, including the time constant information indicating the acceleration/deceleration time constants to be set in the machines PM1, PM2, respectively.

In step S51, the generating unit 20d reads, from the storage unit 40, the original NC program OP received from the CAD/CAM apparatus 200.

In step S52, the generating unit 20d decodes a G code for each block of the original NC program OP read in step S51, and acquires command information such as on the XYZ coordinate of a set destination and a feed rate. The generating unit 20d calculates the three-dimensional machining paths P (t, X(t), Y(t), Z(t)) indicated by the original NC program OP, by use of the acquired command information.

In step S53, the frequency analyzing unit 50d reads CAD data from the storage unit 40. The frequency analyzing unit 50d executes the two-dimensional DFT processing to the two-dimensional data of the machining surface shape on the XY plane among the read CAD data, and calculates the distribution of the spatial frequencies in the machining surface shape on the XY plane. The frequency analyzing unit 50d then divides the calculated spatial frequency distribution into the area in which the spatial frequency components are low and the area in which the spatial frequency components are high, on the basis of the specified value determined corresponding to the acceleration/deceleration time constants of the machines PM1, PM2. The frequency analyzing unit 50d executes the two-dimensional IDFT processing in the area in which the spatial frequency components are low, and calculates the distribution of the low spatial frequencies on the XY plane. The frequency analyzing unit 50d executes the two-dimensional IDFT processing in the area in which the spatial frequency components are high, and calculates the distribution of the high spatial frequencies on the XY plane.

In step S54, the generating unit 20d executes the machining path distribution processing, by use of the machining paths P (t, X(t), Y(t), Z(t)) calculated in step S52, and the distribution of the low spatial frequencies and the distribution of the high spatial frequencies on the XY plane calculated in step S53. It is noted that the machining path distribution processing will be described with reference to FIG. 18.

In step S55, the parallelizing unit 30 executes the same processing as the operation in which step S3 is replaced with step S54 in the processing described in step S4 in the first embodiment.

In step S56, as in step S5 in the first embodiment, the generating unit 20d generates the individual NC programs IP1, IP2 for the respective machines PM1, PM2, by use of the machining path data on the respective machines PM1, PM2, on the basis of the adjustment result in step S55.

In step S57, as in step S6 in the first embodiment, the control unit 10 executes in parallel the individual NC programs IP1, IP2 generated in step S56, and controls the machining executed to the single workpiece WR by the respective machines PM1, PM2.

Figure 18:
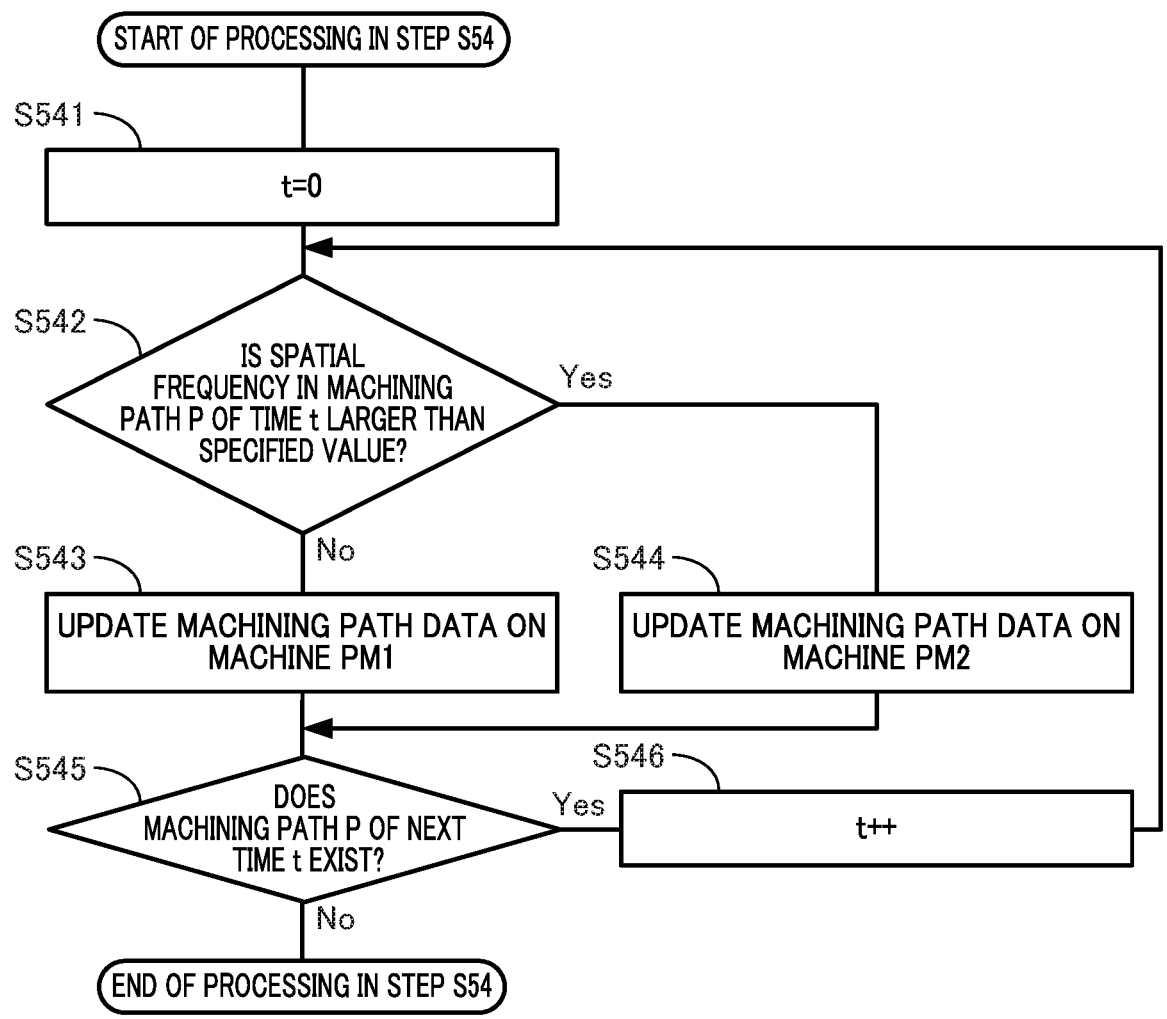
FIG. 18 is a diagram indicating one example of machining path distribution processing of step S54 shown in FIG. 17.

FIG. 18 is a diagram indicating one example of the machining path distribution processing in step S54 shown in FIG. 17.

In step S541, the generating unit 20d resets the time t to 0.

In step S542, the generating unit 20d determines whether or not the spatial frequency in the machining path P of the time t (t, X(t), Y(t), Z(t)) is larger than the specified value determined corresponding to the acceleration/deceleration time constants of the machines PM1, PM2. That is, the generating unit 20d determines whether or not the machining path P of the time t (t, X(t), Y(t), Z(t)) is included in the distribution of the high spatial frequencies on the XY plane. In the case where the machining path P of the time t (t, X(t), Y(t), Z(t)) is included in the distribution of the high spatial frequencies on the XY plane (that is, the case where the spatial frequency in the machining path P (t, X(t), Y(t), Z(t)) is larger than the specified value), the processing to be executed by the numerical controller 100D proceeds to step S544. In the case where the machining path P of the time t (t, X(t), Y(t), Z(t)) is included in the distribution of the low spatial frequencies (that is, the case where the spatial frequency in the machining path P (t, X(t), Y(t), Z(t)) is identical to and lower than the specified value), the processing to be executed by the numerical controller 100D proceeds to step S543.

In step S543, the generating unit 20d adds the machining path P of the time t (t, X(t), Y(t), Z(t)) determined in step S542 into the machining path data on the machine PM1 which does not require high responsiveness and in which a large acceleration/deceleration time constant (that is, low responsiveness at the time of acceleration/deceleration) is set, and updates the data.

In step S544, the generating unit 20d adds the machining path P of the time t (t, X(t), Y(t), Z(t)) determined in step S542 into the machining path data on the machine PM2 which requires high responsiveness and in which a small acceleration/deceleration time constant (that is, high responsiveness at the time of acceleration/deceleration) is set, and updates the data.

In step S545, the generating unit 20d determines whether or not the machining path P of the next time t exists. In the case where the machining path P of the next time t exists, the processing to be executed by the numerical controller 100D proceeds to step S546. In the case where the machining path P of the next time t does not exist, the machining path distribution processing ends, and the processing to be executed by the numerical controller 100D proceeds to step S55 shown in FIG. 17.

In step S546, the generating unit 20d increases the time t by one control cycle time, and the processing to be executed by the numerical controller 100D proceeds to step S542.

As described above, in the fifth embodiment, the numerical controller 100D generates the machining path data on the machines PM1, PM2, according to the spatial frequencies in the machining surface shapes in the machining paths P of respective times t (t, X(t), Y(t), Z(t)). The numerical controller 100D simulates the operations of the machines PM1, PM2 on the basis of the generated machining path data on the machines PM1, PM2, and determines whether or not interference occurs when the machines PM1, PM2 operate cooperatively. The numerical controller 100D then generates the individual NC programs IP1, IP2 for the respective machines PM1, PM2, on the basis of the machining path data on the machines PM1, PM2 and the determination result.

Accordingly, the numerical controller 100D divides the machining surface into the low area in which the spatial frequencies are low and the high area in which the spatial frequencies are high, on the basis of the distribution of the spatial frequencies on the machining surface of the single workpiece WR. The numerical controller 100D is able to generate, from the one original NC program OP to the single workpiece WR, the specific individual NC programs IP1, IP2 for the machine PM1 which has low responsiveness and executes the machining in the low area in which spatial frequencies are low, and the machine PM2 which has high responsiveness and executes the machining in the high area in which spatial frequencies are high. The numerical controller 100D is able to make the machines PM1, PM2 perform machining cooperatively. Accordingly, the machine having low responsiveness executes the machining on the machining surface of the low area corresponding to the low spatial frequency components, and the machine having high responsiveness executes the machining on the machining surface corresponding to high frequency components, thereby enabling to ensure the quality on the machining surface and improve the efficiency in machining as a whole.

As in the first to third embodiments, in the individual NC programs IP1, IP2 for the machines PM1, PM2, the operations of the machines PM1, PM2 are to be adjusted according to the determination result such as of interference between the machines PM1, PM2. This allows to improve the efficiency in machining by the numerical controller 100D, thereby reducing the cycle time.

The first to fifth embodiments according to the present invention have been described so far. The present invention is not limited to the above-described embodiments. The effects described in the above embodiments are merely introduced as the most preferable effects produced by the present invention. The effects according to the present invention are not limited to those described in the embodiments.

[Modifications]

The numerical controller 100 (100A, 100B, 100C, 100D) according to each of the first to fifth embodiments generates the individual NC programs IP1, IP2 for the machines PM1, PM2. The present invention is not limited thereto. In an example, either one of the machines PM1, PM2 may be a robot capable of being equipped with a variety of tools. In this case, the numerical controller 100 converts the individual NC programs IP1, IP2 described in G codes to programs for robot, by use of, for example, KR C4 robot controller of KUKA (registered trademark) AG (https://www.kuka.com/en-gb/products/robotics-systems/robot-controllers/kr-c4). It is noted that the robot controller for converting the NC programs described in G codes to programs for robot is not limited to this, or alternatively another controller may be used.

A robot and a machine table may be aligned so that the relative positional relation between the robot and the machine table are maintained, and each shaft of the robot may be controlled on the basis of inverse kinematics operation.

EXPLANATION OF REFERENCE NUMERALS

10 CONTROL UNIT
20 GENERATING UNIT
30 PARALLELIZING UNIT
40 STORAGE UNIT
100 NUMERICAL CONTROLLER
200 CAD/CAM APPARATUS
MC MACHINING CENTER

What is claimed is:

1. A numerical control method executed by a computer, the numerical control method comprising:
a generating step of dividing, into a plurality of paths, a machining path of a first machining program for a machine configured to machine a single workpiece, corresponding to contents of machining to the workpiece in the first machining program, and of generating, on a basis of the respective divided machining paths, a plurality of second machining programs for a plurality of machines corresponding to the respective machining paths; and
a frequency analyzing step of executing frequency analysis to the machining path indicated in the first machining program, and dividing the machining path on a frequency component-by-frequency component basis, wherein
in the generating step, the plurality of second machining programs is generated by way of assignment of each of the machining paths divided on the frequency component-by-frequency component basis to any one of the plurality of machines according to performance of the plurality of machines.

2. The numerical control method according to claim 1, wherein
the performance of the plurality of machines corresponds to acceleration/deceleration time constants.

3. A numerical control method executed by a computer, the numerical control method comprising:
a generating step of dividing, into a plurality of paths, a machining path of a first machining program for a machine configured to machine a single workpiece, corresponding to contents of machining to the workpiece in the first machining program, and of generating, on a basis of the respective divided machining paths, a plurality of second machining programs for a plurality of machines corresponding to the respective machining paths; and
a frequency analyzing step of executing frequency analysis to a shape to be formed on the workpiece and dividing the shape into a plurality of shapes of spatial frequency components, wherein
the plurality of second machining programs is generated in the generating step, so as to make any one of the plurality of machines form each of the plurality of shapes of spatial frequency components according to performance of the plurality of machines.

4. A processing device comprising:
a processor; and
a memory,
wherein the processor is configured to:
divide, into a plurality of paths, a machining path of a first machining program for a machine configured to machine a single workpiece, corresponding to contents of machining to the workpiece in the first machining program, and generate, on a basis of the respective divided machining paths, a plurality of second machining programs for a plurality of machines corresponding to the respective machining paths; and
execute frequency analysis to the machining path indicated in the first machining program, and divide the machining path on a frequency component-by-frequency component basis, and
wherein the processor generates the plurality of second machining programs by way of assignment of each of the machining paths divided on the frequency component-by-frequency component basis to any one of the plurality of machines according to performance of the plurality of machines.

5. A processing device comprising:
a processor; and
a memory,
wherein the processor is configured to:
   divide, into a plurality of paths, a machining path of a first machining program for a machine configured to machine a single workpiece, corresponding to contents of machining to the workpiece in the first machining program, and generate, on a basis of the respective divided machining paths, a plurality of second machining programs for a plurality of machines corresponding to the respective machining paths; and
   execute frequency analysis to a shape to be formed on the workpiece and divide the shape into a plurality of shapes of spatial frequency components, and
wherein the processor generates the plurality of second machining programs, so as to make any one of the plurality of machines form each of the plurality of shapes of spatial frequency components according to performance of the plurality of machines.

* * * * *